United States Patent
Jang et al.

(10) Patent No.: US 12,058,336 B2
(45) Date of Patent: Aug. 6, 2024

(54) METHOD AND DEVICE FOR REMOVING REDUNDANT SYNTAX FROM MERGE DATA SYNTAX

(71) Applicant: LG ELECTRONICS INC., Seoul (KR)

(72) Inventors: Hyeongmoon Jang, Seoul (KR); Naeri Park, Seoul (KR); Seunghwan Kim, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 17/615,432

(22) PCT Filed: Jun. 23, 2020

(86) PCT No.: PCT/KR2020/008154
§ 371 (c)(1),
(2) Date: Nov. 30, 2021

(87) PCT Pub. No.: WO2020/262930
PCT Pub. Date: Dec. 30, 2020

(65) Prior Publication Data
US 2022/0232218 A1    Jul. 21, 2022

Related U.S. Application Data

(60) Provisional application No. 62/865,289, filed on Jun. 23, 2019.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11);
(Continued)

(58) Field of Classification Search
CPC .. H04N 19/105; H04N 19/109; H04N 19/132; H04N 19/137; H04N 19/159;
(Continued)

(56) References Cited

FOREIGN PATENT DOCUMENTS

| KR | 20180073711 A |   | 7/2018 |
|----|---------------|---|--------|
| KR | 20200095982 A | * | 8/2020 |

OTHER PUBLICATIONS

Bross et al. ("Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N1001-v10). (Year: 2019).*

(Continued)

*Primary Examiner* — Maria E Vazquez Colon
(74) *Attorney, Agent, or Firm* — Bryan Cave Leighton Paisner LLP

(57) ABSTRACT

A decoding method performed by a decoding device according to the present document comprises the steps of: determining a prediction mode of a current block on the basis of information about a prediction mode obtained from a bitstream; constructing a merge candidate list on the basis of the prediction mode; deriving motion information of the current block on the basis of the merge candidate list; and generating prediction samples of the current block on the basis of the motion information, wherein the bitstream includes information about a combined inter-picture merge and intra-picture prediction (CIIP) available flag indicating whether the CLIP is available, and the determination step may include a step of acquiring a regular merge flag from the bitstream on the basis of the CIIP available flag.

4 Claims, 14 Drawing Sheets

(51) Int. Cl.
    *H04N 19/132*    (2014.01)
    *H04N 19/159*    (2014.01)
    *H04N 19/176*    (2014.01)
    *H04N 19/46*    (2014.01)

(52) U.S. Cl.
    CPC ......... *H04N 19/159* (2014.11); *H04N 19/176* (2014.11); *H04N 19/46* (2014.11)

(58) Field of Classification Search
    CPC .... H04N 19/176; H04N 19/184; H04N 19/46; H04N 19/513; H04N 19/52; H04N 19/70
    See application file for complete search history.

(56) References Cited

OTHER PUBLICATIONS

B. Bross et al., "Working Draft 5 of Versatile Video Coding", International Organization for Standardization Organisation Internationale De Normalisation ISO/IEC JTC 1/SC 29/WG 11 Coding of Moving Pictures and Audio, Mar. 2019, JVET-N1001-v10.

Man-Shu Chiang, et al., "CE10.1.1: Multi-hypothesis prediction for improving AMVP mode, skip or merge mode, and intra mode", Joint Video Experts Team (JVET) of ITU-T SG 16 WP 3 and ISO/IEC JTC 1/SC 29/WG 11, 12th Meeting: Macao, CN, Oct. 3-12, 2018. JVET-L0100-v23.

Yi-Wen Chen, et al., "Non-CE4: Regular merge flag coding", Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M0231.

Yi-Wen Chen, et al., "CE4: Regular merge flag coding (CE4-1.2.a and CE4-1.2.b)", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N0324.

Benjamin Bross, et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N1001-v8.

* cited by examiner

METHOD AND DEVICE FOR REMOVING REDUNDANT SYNTAX FROM MERGE DATA SYNTAX

CROSS-REFERENCE TO RELATED APPLICATIONS

This application is a National Stage filing under 35 U.S.C. 371 of International Application No. PCT/KR2020/008154, with an international filing date of Jun. 23, 2020, which claims the benefit of U.S. Provisional Application No. 62/865,289, filed on Jun. 23, 2019, all of which are incorporated by reference in their entirety herein.

BACKGROUND OF DISCLOSURE

Field of the Disclosure

This technology relates to a method and apparatus for removing redundant syntax from merge data syntax in a video/image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An aspect of the present disclosure is to provide a method and an apparatus for enhancing image coding efficiency.

Another aspect of the present disclosure is to provide a method and an apparatus for efficiently performing inter prediction.

Still another aspect of the present disclosure is to provide a method and an apparatus for removing unnecessary signaling during inter prediction.

Still another aspect of the present disclosure is to provide a method and an apparatus for efficiently signaling information on a merge mode during inter prediction.

Still another aspect of the present document is to provide a method and apparatus for removing redundant syntax from merge data syntax.

According to an embodiment of this document, a decoding method performed by a decoding apparatus includes determining a prediction mode of a current block based on information about a prediction mode obtained from a bitstream, configuring a merge candidate list based on the prediction mode, deriving motion information of the current block based on the merge candidate list, and generating prediction samples of the current block based on the motion information, wherein the bitstream includes information about a combined inter-picture merge and intra-picture prediction (CIIP) availability flag indicating whether or not CIIP is available, and wherein the determining includes obtaining a regular merge flag from the bitstream based on the CIIP availability flag.

According to an embodiment of this document, an encoding method performed by an encoding apparatus includes determining a prediction mode of a current block, configuring a merge candidate list based on the prediction mode, deriving motion information of the current block based on the merge candidate list, deriving prediction samples of the current block based on the motion information, deriving residual samples based on the prediction samples, and encoding image information including information about a prediction mode generated based on the prediction mode, and residual information generated based on the residual samples, wherein the image information includes information about a CIIP availability flag indicating whether or not CIIP is available, and wherein the image information includes a regular merge flag based on the CIIP availability flag.

According to still another embodiment of this document, there is provided a computer-readable digital storage medium containing information which causes a decoding apparatus to perform a decoding method, the decoding method including determining a prediction mode of a current block based on information about a prediction mode obtained from a bitstream, configuring a merge candidate list based on the prediction mode, deriving motion information of the current block based on the merge candidate list, and generating prediction samples of the current block based on the motion information, wherein the bitstream includes information about a combined inter-picture merge and intra-picture prediction (CIIP) availability flag indicating whether or not CIIP is available, and wherein the determining includes obtaining a regular merge flag from the bitstream based on the CIIP availability flag.

According to the embodiment of the present disclosure, the overall image/video compression efficiency can be enhanced.

According to the embodiment of the present disclosure, the inter prediction can be efficiently performed.

According to the embodiment of the present disclosure, the signaling of the unnecessary syntax can be efficiently removed during the inter prediction.

According to the embodiment of the present disclosure, the information on the merge mode can be efficiently signaled during the inter prediction.

According to the embodiment of the present disclosure, it is possible to remove redundant syntax from the merge data syntax.

DESCRIPTION OF EMBODIMENTS

Figure 1:
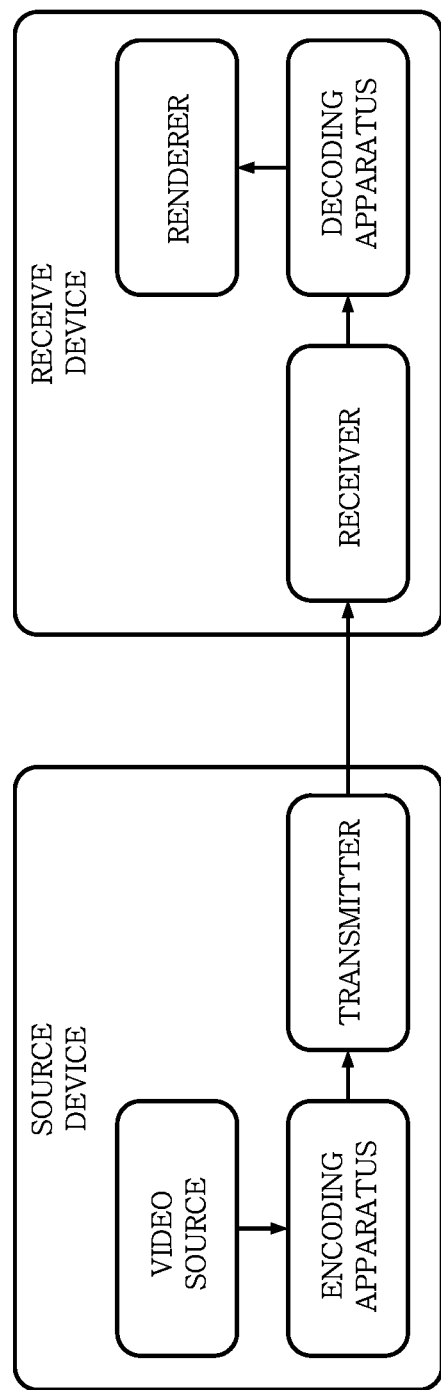
FIG. 1 schematically illustrates an example of a video/image coding system to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

This document relates to video/image coding. For example, a method/embodiment disclosed in this document may be applied to a method disclosed in the versatile video coding (VVC) standard. Also, for example, a method/embodiment disclosed in this document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In this document, at least one of quantization/dequantization and/or transform/inverse transform may be omitted. In case that the quantization/dequantization is omitted, the quantized transform coefficient may be called a transform coefficient. In case that the transform/inverse transform is omitted, the transform coefficient may be called a coefficient or a residual coefficient, or may be still called a transform coefficient for unity of expression.

In this document, the quantized transform coefficient and the transform coefficient may be called a transform coefficient and a scaled transform coefficient, respectively. In this case, residual information may include information on transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. This may be applied/expressed in the same manner with respect to other parts of this document.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Figure 2:
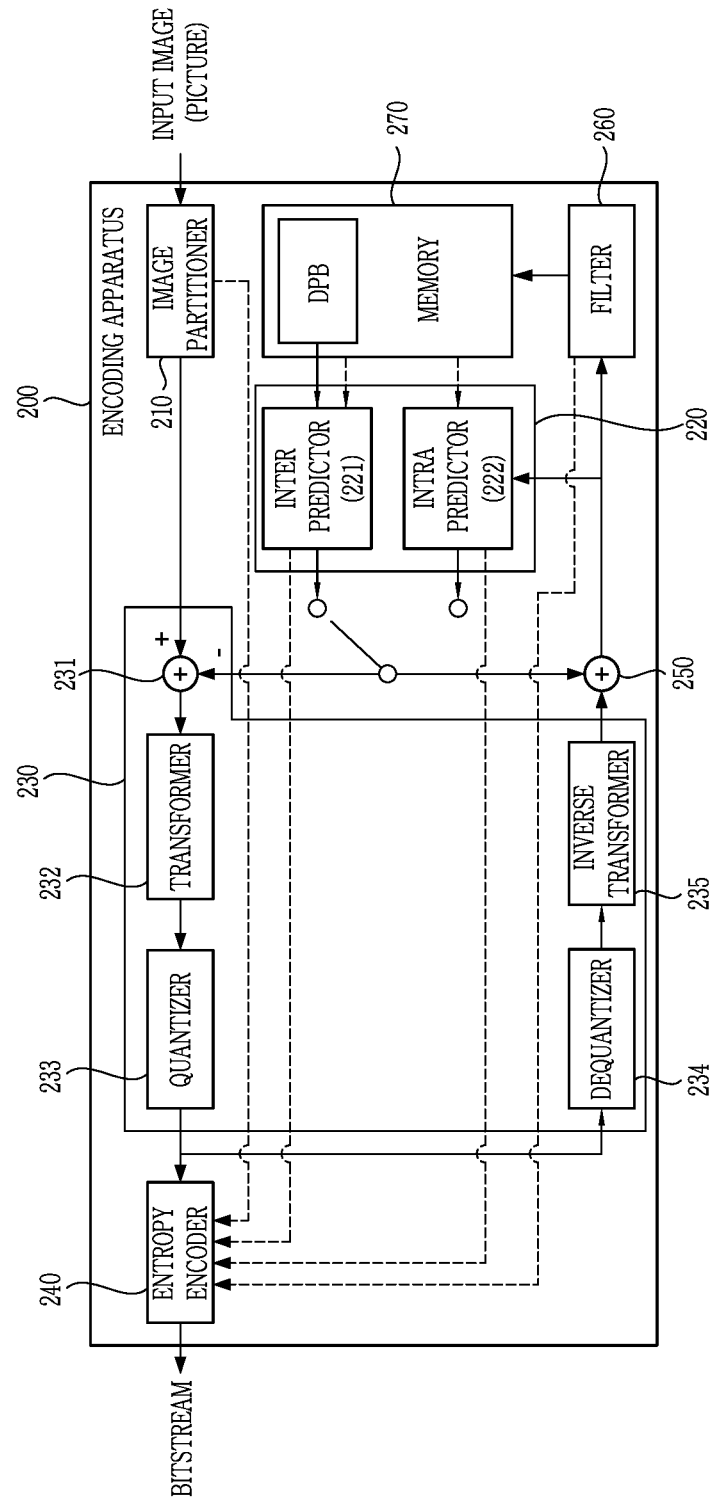
FIG. 2 is a diagram schematically explaining the configuration of a video/image encoding apparatus to which embodiments of the present disclosure are applicable.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the component for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode.

The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal.

The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square. The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information.

The quantizer 233 may rearrange the quantized transform coefficients having a block form in a one-dimensional vector form based on a coefficient scan order, and also generate the information about the quantized transform coefficients based on the quantized transform coefficients of the one dimensional vector form.

The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
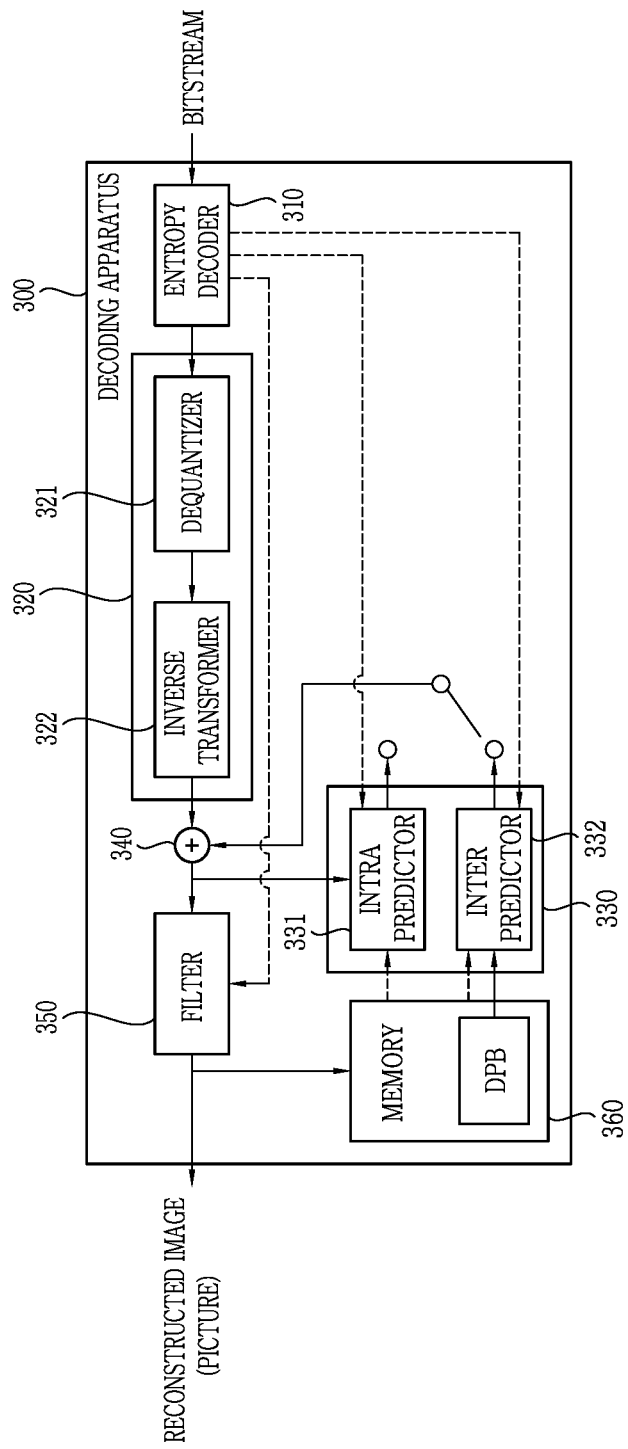
FIG. 3 is a diagram schematically explaining the configuration of a video/image decoding apparatus to which embodiments of the present disclosure are applicable.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320.

The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

The video/image coding method according to the present disclosure may be performed based on the following partitioning structure. Specifically, procedures of prediction, residual processing ((inverse) transform and (de)quantization), syntax element coding, and filtering to be described later may be performed based on CTU and CU (and/or TU and PU) derived based on the partitioning structure. A block partitioning procedure may be performed by the image partitioner 210 of the above-described encoding apparatus, and partitioning-related information may be (encoding) processed by the entropy encoder 240, and may be transferred to the decoding apparatus in the form of a bitstream. The entropy decoder 310 of the decoding apparatus may derive the block partitioning structure of the current picture based on the partitioning-related information obtained from the bitstream, and based on this, may perform a series of procedures (e.g., prediction, residual processing, block/picture reconstruction, in-loop filtering, and the like) for image decoding. The CU size and the TU size may be equal to each other, or a plurality of TUs may be present within a CU region. Meanwhile, the CU size may generally represent a luma component (sample) coding block (CB) size. The TU size may generally represent a luma component (sample) transform block (TB) size. The chroma component (sample) CB or TB size may be derived based on the luma component (sample) CB or TB size in accordance with a component ratio according to a color format (chroma format, e.g., 4:4:4, 4:2:2, 4:2:0 and the like) of a picture/image. The TU size may be derived based on maxTbSize. For example, if the CU size is larger than the maxTbSize, a plurality of TUs (TBs) of the maxTbSize may be derived from the CU, and the transform/inverse transform may be performed in the unit of TU (TB). Further, for example, in case that intra prediction is applied, the intra prediction mode/type may be derived in the unit of CU (or CB), and neighboring reference sample derivation and prediction sample generation procedures may be performed in the unit of TU (or TB). In this case, one or a plurality of TUs (or TBs) may be present in one CU (or CB) region, and in this case, the plurality of TUs (or TBs) may share the same intra prediction mode/type.

Further, in the video/image coding according to the present disclosure, an image processing unit may have a hierarchical structure. One picture may be partitioned into one or more tiles, bricks, slices, and/or tile groups. One slice may include one or more bricks. On brick may include one or more CTU rows within a tile. The slice may include an integer number of bricks of a picture. One tile group may include one or more tiles. One tile may include one or more CTUs. The CTU may be partitioned into one or more CUs. A tile represents a rectangular region of CTUs within a particular tile column and a particular tile row in a picture. A tile group may include an integer number of tiles according to a tile raster scan in the picture. A slice header may carry information/parameters that can be applied to the corresponding slice (blocks in the slice). In case that the encoding/decoding apparatus has a multi-core processor, encoding/decoding processes for the tiles, slices, bricks, and/or tile groups may be processed in parallel. In this document, the slice or the tile group may be used exchangeably. That is, a tile group header may be called a slice header. Here, the slice may have one of slice types including intra (I) slice, predictive (P) slice, and bi-predictive (B) slice. In predicting blocks in I slice, inter prediction may not be used, and only intra prediction may be used. Of course, even in this case, signaling may be performed by coding the original sample value without prediction. With respect to blocks in P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

The encoder may determine the tile/tile group, brick, slice, and maximum and minimum coding unit sizes in consideration of the coding efficiency or parallel processing according to the characteristics (e.g., resolution) of a video image, and information for them or information capable of inducing them may be included in the bitstream.

The decoder may obtain information representing the tile/tile group, brick, and slice of the current picture, and whether the CTU in the tile has been partitioned into a plurality of coding units. By making such information be obtained (transmitted) only under a specific condition, the efficiency can be enhanced.

The slice header (slice header syntax) may include information/parameters that can be commonly applied to the slice. APS (APS syntax) or PPS (PPS syntax) may include information/parameters that can be commonly applied to one or more pictures. The SPS (SPS syntax) may include information/parameters that can be commonly applied to one or more sequences. The VPS (VPS syntax) may include information/parameters that can be commonly applied to multiple layers. The DPS (DPS syntax) may include information/parameters that can be commonly applied to overall video. The DPS may include information/parameters related to concatenation of a coded video sequence (CVS).

In this document, an upper-level syntax may include at least one of the APS syntax, PPS syntax, SPS syntax, VPS syntax, DPS syntax, and slice header syntax.

Further, for example, information about partitioning and configuration of the tile/tile group/brick/slice may be configured by an encoding end through the upper-level syntax, and may be transferred to the decoding apparatus in the form of a bitstream.

In image/video coding, a picture constituting an image/video may be encoded/decoded according to a decoding order. A picture order, which corresponds to an output order of decoded pictures, may be set differently from the decoding order, based on which backward prediction as well as forward prediction may also be performed in the inter prediction.

The picture decoding procedure may schematically include an image/video information obtaining procedure from a bitstream (through decoding), a picture reconstruction procedure, and an in-loop filtering procedure for the reconstructed picture. The picture reconstruction procedure may be performed based on the residual samples and the prediction samples obtained through the inter/intra prediction and the residual procedure (dequantization, inverse transform for the quantized transform coefficient) described herein. Through the in-loop filtering procedure for the reconstructed picture which has been generated though the picture reconstruction procedure, a modified reconstructed picture may be generated, which may be output as a decoded picture, and may also be stored in the decoding picture buffer or a memory 360 of the decoding apparatus and used as a reference picture in the inter prediction procedure of the later picture decoding. According to circumstances, the in-loop filtering procedure may be omitted, and in this case, the reconstructed picture may be output as a decoded picture, and may also be stored in the decoding picture buffer or a memory 360 of the decoding apparatus and used as a reference picture in the inter prediction procedure of the later picture decoding. The in-loop filtering procedure may include the deblocking filtering procedure, the sample adaptive offset (SAO) procedure, the adaptive loop filter (ALF) procedure, and/or the bi-lateral filter procedure as described above, all or some of which may be omitted. Further, one or some of the deblocking filtering procedure, the sample adaptive offset (SAO) procedure, the adaptive loop filter (ALF) procedure, and the bi-lateral filter procedure may be sequentially applied, or all of them may be sequentially applied. For example, after the deblocking procedure is applied to the reconstructed picture, the SAO procedure may be performed thereon. Alternatively, for example, after the deblocking filtering procedure is applied to the reconstructed picture, the ALF procedure may be performed thereon. This may be likewise performed in the encoding apparatus.

The picture encoding procedure may schematically include a procedure of generating a reconstructed picture for a current picture and a procedure (optional) of applying in-loop filtering to the reconstructed picture, as well as a procedure of encoding information for picture reconstruction (e.g., prediction information, residual information, partitioning information or the like) and outputting it in the form of a bitstream. The encoding apparatus may derive (modified) residual samples from a quantized transform coefficient through the dequantizer 234 and the inverse transformer 235, and may generate a reconstructed picture based on the (modified) residual samples and the prediction samples. The reconstructed picture generated in this way may be the same as the above-described reconstructed picture generated in the decoding apparatus. Through the in-loop filtering procedure for the reconstructed picture, the modified reconstructed picture may be generated, which may be stored in the decoding picture buffer or a memory 270, and used as a reference picture in the inter prediction procedure of the later picture encoding, similarly to the case of the decoding apparatus. As described above, all or a part of the in-loop filtering procedure may be omitted according to circumstances. In a case where the in-loop filtering procedure is performed, (in-loop) filtering-related information (parameter) may be encoded in the entropy encoder 240 and output in the form of a bitstream, and the decoding apparatus may perform the in-loop filtering procedure in the same way as that of the encoding apparatus based on the filtering-related information.

Through this in-loop filtering procedure, it is possible to reduce noises, such as deblocking artifact and ringing artifact, which are generated during the image/video coding, and to increase subjective/objective visual quality. Further, as the in-loop filtering procedure is performed in both the encoding apparatus and the decoding apparatus, the encoding apparatus and the decoding apparatus can derive the same prediction result, increase the reliability of the picture coding, and reduce the amount of data to be transmitted for picture coding.

As described above, the picture reconstruction procedure may be performed in the encoding apparatus as well as in the decoding apparatus. Based on intra prediction/inter prediction on each block unit, a reconstructed block may be generated, and a reconstructed picture including the reconstructed blocks may be generated. In a case where a current picture/slice/tile group is an I picture/slice/tile group, the blocks included in the current picture/slice/tile group may be reconstructed only based on the intra prediction. Meanwhile, in a case where a current picture/slice/tile group is a P or B picture/slice/tile group, the blocks included in the current picture/slice/tile group may be reconstructed based on the intra prediction or inter prediction. In this case, the inter prediction may be applied to some of the blocks in the current picture/slice/tile group, and the intra prediction may be applied to some of the rest of the blocks. A colour component of the picture may include a luma component and a chroma component, and the methods and embodiments proposed in this document may be applied to the luma component and the chroma component unless explicitly limited by this document.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In case that inter prediction is applied to the current block, the predictor of the encoding apparatus/decoding apparatus may derive prediction samples by performing inter prediction in the unit of a block. Inter prediction can be a prediction derived in a manner that is dependent on data elements (e.g., sample values or motion information) of picture(s) other than the current picture. In case that inter prediction is applied to the current block, a predicted block (prediction sample array) for the current block may be induced based on a reference block (reference sample array) specified by a motion vector on a reference picture indicated by a reference picture index. In this case, in order to reduce an amount of motion information being transmitted in an inter prediction mode, motion information of the current block may be predicted in the unit of a block, a subblock, or a sample based on correlation of motion information between a neighboring block and the current block. The motion information may include a motion vector and a reference picture index. The motion information may further include inter prediction type (L0 prediction, L1 prediction, Bi prediction, and the like) information. In case that the inter prediction is applied, the neighboring block may include a spatial neighboring block existing in the current picture and a temporal neighboring block existing in the reference picture. The reference picture including the reference block and the reference picture including the temporal neighboring block may be equal to or different from each other. The temporal neighboring block may be called a collocated reference block or collocated CU (colCU), and the reference picture including the temporal neighboring block may be called a collocated picture (colPic). For example, a motion information candidate list may be configured based on neighboring blocks of the current block, and flag or index information indicating which candidate is selected (used) to derive the motion vector of the current block and/or the reference picture index may be signaled. The inter prediction may be performed based on various prediction modes, and for example, in case of a skip mode and a (normal) merge mode, the motion information of the current block may be equal to the motion information of the selected neighboring block. In case of the skip mode, unlike the merge mode, the residual signal may not be transmitted. In case of a motion vector prediction (MVP) mode, the motion vector of the selected neighboring block may be used as a motion vector predictor, and a motion vector difference may be signaled. In this case, the motion vector of the current block may be derived using a sum of the motion vector predictor and the motion vector difference.

An inter prediction based video/image encoding procedure may schematically include, for example, the followings.

Figure 4:
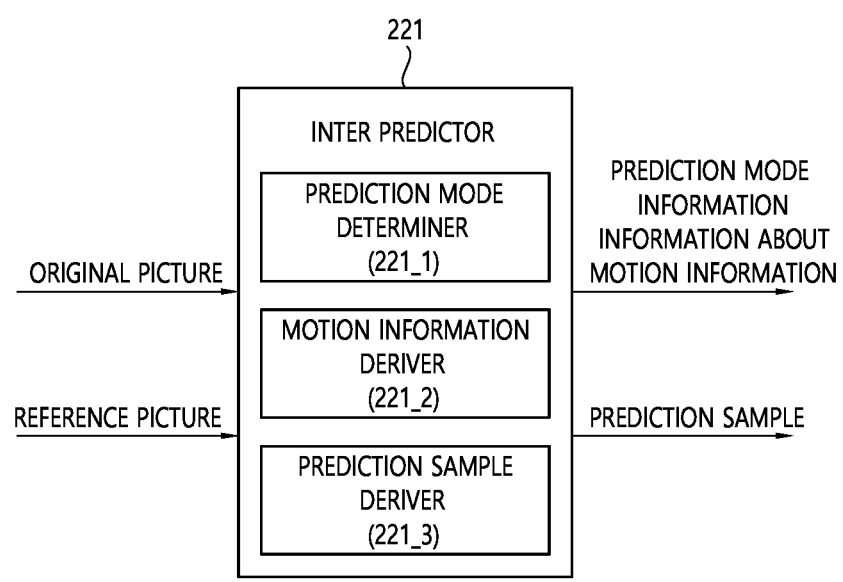
FIG. 4 is a diagram schematically representing an inter predictor in an encoding apparatus.

FIG. 4 is a diagram schematically representing an inter predictor in an encoding apparatus.

Referring to FIG. 4, the encoding apparatus performs inter prediction on a current block. The encoding apparatus may derive inter prediction mode and motion information of the current block, and generate prediction samples of the current block. Here, inter prediction mode determination, motion information derivation, and prediction sample generation procedure may be performed at the same time, or performed one after another. For example, the inter predictor 221 of the encoding apparatus may include a prediction mode determiner 221_1, a motion information deriver 221_2, and a prediction sample deriver 221_3. The prediction mode determiner 221_1 may determine a prediction mode for the current block; the motion information deriver 221_2 may derive motion information of the current block; and the prediction sample deriver 221_3 may derive prediction samples of the current block. For example, the inter predictor 221 of the encoding apparatus may search for a block similar to the current block in a certain region (search region) of the reference pictures through motion estimation, and derive a reference block whose difference from the current block is minimum, or less than or equal to a certain level. Based on this, the reference picture index indicating a reference picture on which the reference block is located may be derived, and based on the difference in position between the reference block and the current block, the motion vector may be derived. The encoding apparatus may determine a mode from among various prediction modes, which is applied to the current block. The encoding apparatus may compare rate-distortion (RD) costs for the various prediction modes, and determine the optimal prediction mode for the current block.

For example, in case that the skip mode or the merge mode is applied to the current block, the encoding apparatus may configure a merge candidate list to be described later, and may derive a reference block having a difference from the current block, which is minimum or is equal to or smaller than a predetermined reference, among reference blocks indicated by merge candidates included in the merge candidate list. In this case, a merge candidate related to the derived reference block may be selected, and merge index information indicating the selected merge candidate may be generated and signaled to the decoding apparatus. The motion information of the current block can be derived using the motion information of the selected merge candidate.

As another example, in case that an (A)MVP mode is applied to the current block, the encoding apparatus may configure an (A)MVP candidate list to be described later, and may use the motion vector of a motion vector predictor (mvp) candidate selected among mvp candidates included in the (A)MVP candidate list as the mvp of the current block. In this case, for example, the motion vector indicating the reference block derived by the above-described motion estimation may be used as the motion vector of the current block, and the mvp candidate having the motion vector having the smallest difference from the motion vector of the current block among the mvp candidates may become the selected mvp candidate. The motion vector difference (MVD), which is a difference obtained by subtracting the mvp from the motion vector of the current block, may be derived. In this case, information on the MVD may be signaled to the decoding apparatus. Further, in case that the (A)MVP mode is applied, the reference picture index value may be configured as reference picture index information, and may be separately signaled to the decoding apparatus.

The encoding apparatus may derive residual samples based on the prediction samples. The encoding apparatus may derive the residual samples through comparison of the original samples of the current block with the prediction samples.

The encoding apparatus encodes image information including prediction information and residual information. The encoding apparatus may output the encoded image information in the form of a bitstream. The prediction information may be information related to the prediction procedure, and may include information about prediction mode information (e.g., skip flag, merge flag, or mode index) and motion information. The information about the motion information may include candidate selection information (e.g., merge index, mvp flag, or mvp index) that is information for deriving the motion vector. Further, the information about the motion information may include information on the above-described MVD and/or reference picture index information. Further, the information about the motion information may include information indicating whether L0 prediction, L1 prediction or bi-prediction is applied. The residual information is information related to the residual samples. The residual information may include information on the quantized transform coefficients for the residual samples.

The output bitstream may be stored in a (digital) storage medium to be transferred to the decoding apparatus, or may be transferred to the decoding apparatus through a network.

Meanwhile, as described above, the encoding apparatus may generate a reconstructed picture (including reconstructed samples and reconstructed blocks) based on the reference samples and the residual samples. This is for the encoding apparatus to derive the same prediction result as that performed by the decoding apparatus, and through this, the coding efficiency can be enhanced. Accordingly, the encoding apparatus may store the reconstructed picture (or reconstructed samples or reconstructed blocks) in a memory, and may utilize the stored reconstructed picture as a reference picture for inter prediction. As described above, an in-loop filtering procedure can be further applied to the reconstructed picture.

An inter prediction based video/image decoding procedure may schematically include, for example, the followings.

Figure 5:
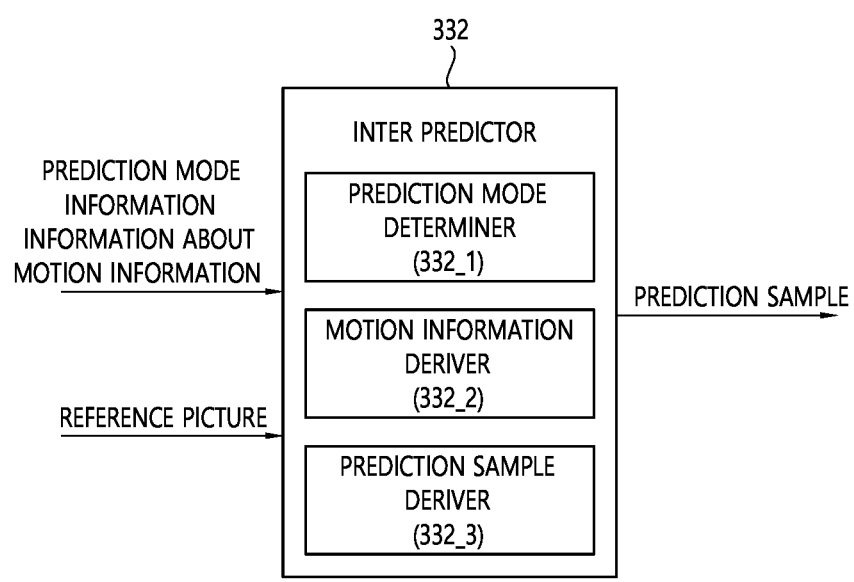
FIG. 5 is a diagram schematically representing an inter predictor in a decoding apparatus.

FIG. 5 is a diagram schematically representing an inter predictor in a decoding apparatus.

Referring to FIG. 5, a decoding apparatus may perform an operation corresponding to the operation performed by the encoding apparatus. The decoding apparatus may perform prediction for the current block based on received prediction information, and may derive prediction samples.

Specifically, the decoding apparatus may determine the prediction mode for the current block based on the received prediction information. The decoding apparatus may determine which inter prediction mode is applied to the current block based on prediction mode information in the prediction information.

For example, the decoding apparatus may determine whether the merge mode is applied or the (A)MVP mode is determined with respect to the current block based on the merge flag. Further, the decoding apparatus may select one of various inter prediction mode candidates based on the mode index. The inter prediction mode candidates may include a skip mode, merge mode, and/or (A)MVP mode, or may include various inter prediction modes to be described later.

The decoding apparatus derives the motion information of the current block based on the determined inter prediction mode. For example, in case that the skip mode or the merge mode is applied to the current block, the decoding apparatus may configure a merge candidate list to be described later, and may select one of merge candidates included in the merge candidate list. Such selection may be performed based on the above-described selection information (merge index). Motion information of the current block may be derived using the motion information of the selected merge candidate. The motion information of the selected merge candidate may be used as the motion information of the current block.

As another example, in case that an (A)MVP mode is applied to the current block, the decoding apparatus may configure an (A)MVP candidate list to be described later, and may use the motion vector of a motion vector predictor (mvp) candidate selected among mvp candidates included in the (A)MVP candidate list as the mvp of the current block. Such selection may be performed based on the above-described selection information (mvp flag or mvp index). In this case, MVD of the current block may be derived based on information on the MVD, and the motion vector of the current block may be derived based on the mvp of the current block and the MVD. Further, a reference picture index of the current block may be derived based on the reference picture index information. A picture indicated by the reference picture index in the reference picture list for the current block may be derived as a reference picture that is referred to for the inter prediction of the current block.

Meanwhile, as described later, the motion information of the current block may be derived without configuring the candidate list, and in this case, the motion information of the current block may be derived according to the procedure disclosed in the prediction mode to be described later. In this case, the above-described candidate list configuration may be omitted.

The decoding apparatus may generate prediction samples for the current block based on the motion information of the current block. In this case, the reference picture may be derived based on the reference picture index of the current block, and the prediction samples of the current block may be derived using samples of the reference block indicated by the motion vector of the current block on the reference picture. In this case, as described later, a prediction sample filtering procedure for all or parts of the prediction samples of the current block may be further performed in some cases.

For example, the inter predictor (332) of the decoding apparatus may include a prediction mode determination unit (332_1), a motion information derivation unit (332_2), and a prediction sample derivation unit (332_3). The prediction mode determination unit (332_1) may determine a prediction mode for the current block based on the received prediction mode information, the motion information derivation unit (332_2) may derive motion information (motion vector and/or reference picture index) of the current block based on the information about the received motion information, and the prediction sample derivation unit (332_3) may derive prediction samples of the current block.

The decoding apparatus generates residual samples for the current block based on the received residual information. The decoding apparatus may generate reconstructed samples for the current block based on the prediction samples and the residual samples, and based on this, may generate a reconstructed picture. Thereafter, as described above, an in-loop filtering procedure may be further applied to the reconstructed picture.

As described above, an inter prediction procedure may include steps of inter prediction mode determination, motion information derivation according to the determined prediction mode, and prediction performing (prediction sample generation) based on the derived motion information. As described above, the inter prediction procedure may be performed by the encoding apparatus and the decoding apparatus. In this document, the coding apparatus may include the encoding apparatus and/or the decoding apparatus.

For prediction of the current block in the picture, various inter prediction modes may be used. For example, various modes, such as a merge mode, skip mode, motion vector prediction (MVP) mode, affine mode, subblock merge mode, merge with MVD (MMVD) mode, and historical motion vector prediction (HMVP) mode, may be used. A decoder side motion vector refinement (DMVR) mode, adaptive motion vector resolution (AMVR) mode, bi-prediction with CU-level weight (BCW), and bi-directional optical flow (BDOF) may be used further or instead as incidental modes. The affine mode may be called an affine motion prediction mode. The MVP mode may be called an advanced motion vector prediction (AMVP) mode. In this document, a certain mode and/or a motion information candidate derived by the certain mode may be included as one of motion information related candidates of another mode. For example, the HMVP candidate may be added as a merge candidate of the merge/skip mode, or may be added as an mvp candidate of the MVP mode.

Prediction mode information indicating an inter prediction mode for the current block may be signaled from the encoding apparatus to the decoding apparatus. The prediction mode information may be included in the bitstream, and may be received in the decoding apparatus. The prediction mode information may include index information indicating one of a plurality of candidate modes. Further, the inter prediction mode may be indicated through hierarchical signaling of flag information. In this case, the prediction mode information may include one or more flags. For example, whether to apply the skip mode may be indicated by signaling a skip flag, and in case that the skip mode is not applied, whether to apply the merge mode may be indicated by signaling the merge flag, and in case that the merge mode is not applied, it may be indicated that the MVP mode is applied, or a flag for additional division may be further signaled. The affine mode may be signaled as an independent mode, or may be signaled as a dependent mode to the merge mode or MVP mode. For example, the affine mode may include an affine merge mode and an affine MVP mode.

Meanwhile, information representing whether the above-described list0 (L0) prediction, list1 (L1) prediction, or bi-prediction is used for the current block (current coding unit) may be signaled. The information may be called motion prediction direction information, inter prediction direction information, or inter prediction indication information, and may be configured/encoded/signaled in the form of, for example, inter_pred_idc syntax element. That is, the inter_pred_idc syntax element may represent whether the above-described list0 (L0) prediction, list1 (L1) prediction, or bi-prediction is used for the current block (current coding unit). In this document, for convenience in explanation, the inter prediction type (L0 prediction, L1 prediction, or BI prediction) indicated by the inter_pred_idc syntax element may be displayed as a motion prediction direction. The L1 prediction, L1 prediction, and bi-prediction may be represented as pred_L0, pred_L1, and pred_BI, respectively. For example, the following prediction type may be represented according to an inter pred_idc syntax element value.

As described above, one picture may include one or more slices. The slice may have one of slice types including intra (I) slice, predictive (P) slice, and bi-predictive (B) slice. The slice type may be indicated based on slice type information. In predicting blocks in the I slice, inter prediction may not be used, and only intra prediction may be used. Of course, even in this case, signaling may be performed by coding the original sample value without prediction. With respect to blocks in the P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

L0 and L1 may include reference pictures encoded/decoded before the current picture. For example, L0 may include reference pictures before and/or after the current picture in POC order, and L1 may include reference pictures after and/or before the current picture in POC order. In this case, for L0, a relatively lower reference picture index may be allocated to the reference pictures before the current picture in POC order, and for L1, a relatively lower reference picture index may be allocated to the reference pictures after the current picture in POC order. In case of the B slice, the bi-prediction may be applied, and even in this case, uni-directional bi-prediction may be applied, or bi-directional bi-prediction may be applied. The bi-directional bi-prediction may be called true bi-prediction.

Specifically, for example, information on the inter prediction mode for the current block may be coded and signaled at a CU (CU syntax) level, or may be implicitly determined according to conditions. In this case, the information may be explicitly signaled with respect to some modes, and may be implicitly derived with respect to the remaining modes.

For example, the CU syntax may carry information on an (inter) prediction mode as in Table 1 below.

TABLE 1

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|      !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|      && !( cbWidth = = 4 && cbHeight = = 4 ) ) | |
|      pred_mode_flag | ae(v) |
|     if( ( ( slice_type = = I && cu_skip_flag[ x0 ][ y0 ] = =0 ) \|\| | |
|      ( slice_type != I && ( CuPredMode[ x0 ][ y0 ] != MODE_INTRA \|\| | |
|      ( cbWidth = = 4 && cbHeight = = 4 && cu_skip_flag[ x0 ][ y0 ] = = 0 ) ) ) ) && | |
|      sps_ibc_enabled_flag && ( cbWidth != 128 \|\| cbHeight != 128 ) ) | |
|      pred_mode_ibc_flag | ae(v) |
|   } | |
|   if( CuPredMode[ x0 ][ y0 ] = = MODE_INTRA ) { | |
|     if( sps_pcm_enabled_flag && | |
|      cbWidth >= MinIpcmCbSizeY && cb Width <= MaxIpcmCbSizeY && | |
|      cbHeight >= MinIpcmCbSizeY && cbHeight <= MaxIpcmCbSizeY ) | |
|      pcm_flag[ x0 ][ y0 ] | ae(v) |
|     if( pcm_flag[ x0 ][ y0 ] ) { | |
|      while( !byte_aligned( ) ) | |
|       pcm_alignment_zero_bit | f(1) |
|      pcm_sample( cbWidth, cbHeight, treeType) | |
|     } else { | |
|      if( treeType = = SINGLE_TREE \|\| treeType = = DUAL_TREE_LUMA ) { | |
|       if( cbWidth <= 32 && cbHeight <= 32 ) | |
|        intra_bdpcm_flag[ x0 ][ y0 ] | ae(v) |
|       if( intra_bdpcm_flag[ x0 ][ y0 ] ) | |
|        intra_bdpcm_dir_flag[ x0 ][ y0 ] | ae(v) |
|       else { | |
|        if( sps_mip_enabled_flag && | |
|         ( Abs( Log2( cbWidth ) - Log2( cbHeight ) ) <= 2 ) && | |
|         cbWidth <= MaxTbSizeY && cbHeight <= MaxTbSizeY ) | |
|         intra_mip_flag[ x0 ][ y0 ] | ae(v) |
|        if( intra_mip_flag[ x0 ][ y0 ] ) { | |
|         intra_mip_mpm_flag[ x0 ][ y0 ] | ae(v) |
|         if( intra_mip_mpm_flag[ x0 ][ y0 ] ) | |
|          intra_mip_mpm_idx[ x0 ][ y0 ] | ae(v) |
|         else | |
|          intra_mip_mpm_remainder[ x0 ][ y0 ] | ae(v) |
|        } else { | |
|         if( sps_mrl_enabled_flag && ( ( y0 % CtbSizeY ) > 0 ) ) | |
|          intra_luma_ref_idx[ x0 ][ y0 ] | ae(v) |
|         if ( sps_isp_enabled_flag && intra_luma_ref_idx[ x0 ][ y0 ] = = 0 && | |
|          ( cbWidth <= MaxTbSizeY && cbHeight <= MaxTbSizeY ) && | |
|          ( cbWidth * cbHeight > MinTbSizeY * MinTbSizeY ) ) | |
|          intra_subpartitions_mode_flag[ x0 ][ y0 ] | ae(v) |
|         if( intra_subpartitions_mode_flag[ x0 ][ y0 ] = = 1 && | |
|          cbWidth <= MaxTbSizeY && cbHeight <= MaxTbSizeY ) | |
|          intra_subpartitions_split_flag[ x0 ][ y0 ] | ae(v) |
|         if( intra_luma_ref_idx[ x0 ][ y0 ] = = 0 && | |
|          intra_subpartitions_mode_flag[ x0 ][ y0 ] = = 0 ) | |
|          intra_luma_mpm_flag[ x0 ][ y0 ] | ae(v) |
|         if( intra_luma_mpm_flag[ x0 ][ y0 ] ) { | |
|          if( intra_luma_ref_idx[ x0 ][ y0 ] = = 0 ) | |
|           intra_luma_not_planar_flag[ x0 ][ y0 ] | ae(v) |
|          if( intra_luma_not_—planarflag[ x0 ][y0 ] ) | |
|           intra_luma_mpm_idx[ x0 ][ y0 ] | ae(v) |
|         } else | |
|          intra_luma_mpm_remainder[ x0 ][ y0 ] | ae(v) |
|        } | |
|       } | |
|      } | |
|      if( treeType = = SENGLE_TREE \|\| treeType = = DUAL_TREE_CHROMA ) | |

TABLE 1-continued

| | Descriptor |
|---|---|
|       intra_chroma_pred_mode[ x0 ][ y0 ]<br>    }<br>} else if( treeType DUAL_TREE_CHROMA ) { /* MODE_INTER or MODE_IBC */<br>  if( cu_skip_flag[ x0 ][ y0 ] = = 0 )<br>    general_merge_flag[ x0 ][ y0 ] | ae(v)<br><br><br><br>ae(v) |
|   if( general_merge_flag[ x0 ][ y0 ] ) {<br>    merge_data( x0, y0, cbWidth, cbHeight )<br>  } else if ( CuPredMode[ x0 ][ y0 ]  = =  MODE_IBC ) {<br>    mvd_coding( x0, y0, 0, 0 )<br>    mvp_l0_flag[ x0 ][ y0 ] | <br><br><br><br>ae(v) |
|     if( sps_amvr_enabled_flag  &&<br>      ( MvdL0[ x0 ][ y0 ][ 0 ] != 0  ||  MvdL0[ x0 ][ y0 ][ 1 ] != 0 ) ) {<br>      amvr_precision_flag[ x0 ][ y0 ]<br>    }<br>  } else { | <br><br>ae(v) |
|     if( slice_type = = B )<br>      inter_pred_idc[ x0 ][ y0 ]<br>    if( sps_affine_enabled_flag  &&  cbWidth >= 16  &&  cbHeight >== 16 ) {<br>      inter_affine_flag[ x0 ][ y0 ] | <br>ae(v)<br><br>ae(v) |
|       if( sps_affine_type_flag  &&  inter_affine_flag[ x0 ][ y0 ] )<br>        cu_affine_type_flag[ x0 ][ y0 ]<br>    } | <br>ae(v) |
|     if( sps_smvd_enabled_flag  &&  inter_pred_idc[ x0 ][ y0 ] = = PRED_BI  &&<br>      !inter_affine_flag[ x0 ][ y0 ]  &&  RefIdxSymL0 > -1  &&  RefIdxSymL1 ><br>-1 )<br>      sym_mvd_flag[ x0 ][ y0 ] | <br><br><br>ae(v) |
|     if( inter_pred_idc[ x0 ][ y0 ]  !=  PRED_L1 ) {<br>      if( NumRefIdxActive[ 0 ] > 1  &&  !sym_mvd_flag[ x0 ][ y0 ] )<br>        ref_idx_l0[ x0 ][ y0 ] | <br><br>ae(v) |
|       mvd_coding( x0, y0, 0, 0 )<br>      if( MotionModelIdc[ x0 ][ y0 ] > 0)<br>        mvd_coding( x0, y0, 0, 1 )<br>      if(MotionModelIdc[ x0 ][ y0 ] > 1 )<br>        mvd_coding( x0, y0, 0, 2 )<br>      mvp_l0_flag[ x0 ][ y0 ] | <br><br><br><br><br>ae(v) |
|     } else {<br>      MvdL0[ x0 ][ y0 ][ 0 ] = 0<br>      MvdL0[ x0 ][ y0 ][ 1 ] = 0<br>    } | |
|     if( inter_pred_idc[ x0 ][ y0 ]  !=  PRED_L0 ) {<br>      if( NumRefIdxActive[ 1 ] > 1  &&  !sym_mvd_flag[ x0 ][ y0 ] )<br>        ref_idx_l1[ x0 ][ y0 ] | <br><br>ae(v) |
|       if( mvd_l1_zero_flag  &&  inter_pred_idc[ x0 ][ y0 ]  = =  PRED_BI ) {<br>        MvdL1[ x0 ][ y0 ][ 0 ] = 0<br>        MvdL1[ x0 ][ y0 ][ 1 ] = 0<br>        MvdCpL1[ x0 ][ y0 ][ 0 ][ 0 ] = 0<br>        MvdCpL1[ x0 ][ y0 ][ 0 ][ 1 ] = 0<br>        MvdCpL1[ x0 ][ y0 ][ 1 ][ 0 ] = 0<br>        MvdCpL1[ x0 ][ y0 ][ 1 ][ 1 ] = 0<br>        MvdCpL1[ x0 ][ y0 ][ 2 ][ 0 ] = 0<br>        MvdCpL1[ x0 ][ y0 ][ 2 ][ 1 ] = 0<br>      } else {<br>        if( sym_mvd_flag[ x0 ][ y0 ] ) {<br>          MvdL1[ x0 ][ y0 ][ 0 ] = -MvdL0[ x0 ][ y0 ][ 0 ]<br>          MvdL1[ x0 ][ y0 ][ 1 ] = -MvdL0[ x0 ][ y0 ][ 1 ]<br>        } else<br>          mvd_coding( x0, y0, 1, 0 )<br>        if( MotionModelIdc[ x0 ][ y0 ] > 0 )<br>          mvd_coding[ x0, y0, 1, 1 )<br>        if(MotionModelIdc[ x0 ][ y0 ] > 1 )<br>          mvd_coding( x0, y0, 1, 2 )<br>        mvp_l1_flag[ x0 ][ y0 ]<br>      } | <br><br><br><br><br><br><br><br><br><br><br><br><br><br><br><br><br><br><br><br>ae(v) |
|     } else {<br>      MvdL1[ x0 ][ y0 ][ 0 ] = 0<br>      MvdL1[ x0 ][ y0 ][ 1 ] = 0<br>    } | |
|     if( ( sps_amvr_enabled_flag  &&  inter_affine_flag[ x0 ][ y0 ]  = =  0  &&<br>      ( MvdL0[ x0 ][ y0 ][ 0 ]  != 0  ||  MvdL0[ x0 ][ y0 ][ 1 ] != 0  ||<br>      MvdL1[ x0 ][ y0 ][ 0 ]  != 0  ||  MvdL1[ x0 ][ y0 ][ 1 ] ! = 0 ) )  ||<br>      ( sps_affine_amvr_enabled_flag  &&  inter_affine_flag[ x0 ][ y0 ]  = =  1<br>&&<br>        ( MvdCpL0[ x0 ][ y0 ][ 0 ][ 0 ]  !=0  ||  MvdCpL0[ x0 ][ y0 ][ 0 ][ 1 ] != 0<br>||<br>        MvdCpL1[ x0 ][ y0 ][ 0 ][ 0 ]  !=0  ||  MvdCpL1[ x0 ][ y0 ][ 0 ][ 1 ] != 0<br>||<br>        MvdCpL0[ x0 ][ y0 ][ 1 ][ 0 ]  !=0  ||  MvdCpL0[ x0 ][ y0 ][ 1 ][ 1 ] != 0<br>|| | |

TABLE 1-continued

| | Descriptor |
|---|---|
| ``` |  |
|             MvdCpL1[ x0 ][ y0 ][ 1 ][ 0 ]  !=0  ||  MvdCpL1[ x0 ][ y0 ][ 1 ][ 1 ] != 0 || | |
|             MvdCpL0[ x0 ][ y0 ][ 2 ][ 0 ]  !=0  ||  MvdCpL0[ x0 ][ y0 ][ 2 ][ 1 ] != 0 || | |
|             MvdCpL1[ x0 ][ y0 ][ 2 ][ 0 ]  !=0  ||  MvdCpL1[ x0 ][ y0 ][ 2 ][ 1 ] != 0 ) ) { | |
|         amvr_flag[ x0 ][ y0 ] | ae(v) |
|         if( amvr_flag[ x0 ][ y0 ] ) | |
|             amvr_precision_flag[ x0 ][ y0 ] | ae(v) |
|         } | |
|         if( sps_bcw_enabled_flag && inter_pred_idc[ x0 ][ y0 ] == PRED_BI && | |
|             luma_weight_l0_flag[ ref_idx_l0 [ x0 ][ y0 ] ] == 0 && | |
|             luma_weight_l1_flag[ ref_idx_l1 [ x0 ][ y0 ] ] == 0 && | |
|             chroma_weight_l0_flag[ ref_idx_l0 [ x0 ][ y0 ] ] == 0 && | |
|             chroma_weight_l1_flag[ ref_idx_l1 [ x0 ][ y0 ] ] == 0 && | |
|             cbWidth * cbHeight >= 256 ) | |
|             bcw_idx[ x0 ][ y0 ] | ae(v) |
|     } | |
| } | |
| if( !pcm_flag[ x0 ][ y0 ] ) { | |
|     if( CuPredMode[ x0 ][ y0 ] != MODE_INTRA && | |
|         general_merge_flag[ x0 ][ y0 ] == 0 ) | |
|         cu_cbf | ae(v) |
|     if( cu_cbf ) { | |
|         if( CuPredMode[ x0 ][ y0 ] == MODE_INTER && sps_sbt_enabled_flag && | |
|             !ciip_flag[ x0 ][ y0 ] && !MergeTriangleFlag[ x0 ][ y0 ] ) { | |
|             if( cbWidth <= MaxSbtSize && cbHeight <= MaxSbtSize ) { | |
|                 allowSbtVerH = cbWidth >= 8 | |
|                 allowSbtVerQ = cbWidth >= 16 | |
|                 allowSbtHorH = cbHeight >= 8 | |
|                 allowSbtHorQ = cbHeight >= 16 | |
|                 if( allowSbtVerH || allowSbtHorH || allowSbtVerQ || allowSbtHorQ ) | |
|                     cu_sbt_flag | ae(v) |
|             } | |
|             if( cu_sbt_flag ) { | |
|                 if( ( allowSbtVerH || allowSbtHorH ) && ( allowSbtVerQ || ailowSbtHorQ) ) | |
|                     cu_sbt_quad_flag | |
|                 if( ( cu_sbt_quad_flag && allowSbtVerQ && allowSbtHorQ ) || | |
|                     ( !cu_sbt_quad_flag && allowSbtVerH && allowSbtHorH ) ) | |
|                     cu_sbt_horizontal_flag | ae(v) |
|                 cu_sbt_pos_flag | ae(v) |
|             } | |
|         } | |
|         numSigCoeff = 0 | |
|         numZeroOutSigCoeff = 0 | |
|         transform_tree( x0, y0, cbWidth, cbHeight, treeType ) | |
|         lfnstWidth = ( treeType == DUAL_TREE_CHROMA ) ? cbWidth / SubWidthC | |
|                 : cbWidth | |
|         lfnstHeight = ( treeType == DUAL_TREE_CHROMA ) ? cbHeight / SubHeightC | |
|                 : cbHeight | |
|         if( Min( lfnstWidth, lfnstHeight ) >= 4 && sps_lfnst_enabled_flag == 1 && | |
|             CuPredMode[ x0 ][ y0 ] == MODE_INTRA && | |
|             IntraSubPartitionsSplitType == ISP_NO_SPLIT && | |
|             !intra_mip_flag[ x0 ][ y0 ] ) { | |
|             if( ( numSigCoeff > ( ( treeType == SINGLE_TREE ) ? 2 : 1 ) ) && | |
|                 numZeroOutSigCoeff == 0 ) | |
|                 lfnst_idx[ x0 ][ y0 ] | ae(v) |
|         } | |
|     } | |
| } | |
| } | |

Here, cu_skip_flag may represent whether the skip mode is applied to the current block (CU).

pred_mode_flag equal to 0 specifies that the current coding unit is coded in inter prediction mode. pred_mode_flag equal to 1 specifies that the current coding unit is coded in intra prediction mode.

pred_mode_ibc_flag equal to 1 specifies that the current coding unit is coded in IBC prediction mode. pred_mode_ibc_flag equal to 0 specifies that the current coding unit is not coded in IBC prediction mode.

pcm_flag[x0][y0] equal to 1 specifies that the pcm_sample( ) syntax structure is present and the transform_tree( ) syntax structure is not present in the coding unit including the luma coding block at the location (x0, y0). pcm_flag[x0][y0] equal to 0 specifies that pcm_sample( ) syntax structure is not present. That is, pcm_flag may represent whether a pulse coding modulation (PCM) mode is applied to the current block. If the PCM mode is applied to the current block, the prediction, transform, and quantization may not be applied, and the original sample value in the current block may be coded and signaled.

intra_mip_flag[x0][y0] equal to 1 specifies that the intra prediction type for luma samples is matrix-based intra prediction (MIP). intra_mip_flag[x0][y0] equal to 0 specifies that the intra prediction type for luma samples is not matrix-based intra prediction. That is, intra_mip_flag may represent whether the MIP prediction mode (type) is applied to the current block (luma samples of the current block).

intra_chroma_pred_mode[x0][y0] specifies the intra prediction mode for chroma samples in the current block.

general_merge_flag[x0][y0] specifies whether the inter prediction parameters for the current coding unit are inferred from a neighbouring inter-predicted partition. That is, general_merge_flag may represent that a regular merge is enabled, and when the general_merge_flag value is 1, the regular merge mode, mmvd mode, and merge subblock mode (subblock merge mode) are enabled. For example, when the general_merge_flag value is 1, the merge data syntax can be parsed from the encoded video/image information (or bitstream), and the merge data syntax may be configured/coded to include information as represented in Table 2 below.

Here, regular_merge_flag[x0][y0] equal to 1 specifies that regular merge mode is used to generate the inter prediction parameters of the current coding unit. That is, the regular_merge_flag represents whether the merge mode (regular merge mode) is applied to the current block.

mmvd_merge_flag[x0][y0] equal to 1 specifies that merge mode with motion vector difference is used to generate the inter prediction parameters of the current coding unit. That is, the mmvd_merge_flag represents whether the MMVD is applied to the current block.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0].

mmvd_distance_idx[x0][y0] specifies the index used to derive MmvdDistance[x0][y0]. mmvd_direction_idx[x0][y0] specifies index used to derive MmvdSign[x0][y0].

merge_subblock_flag[x0][y0] specifies whether the subblock-based inter prediction parameters for the current coding. That is, the merge_subblock_flag may represent whether a subblock merge mode (or affine merge mode) is applied to the current block.

merge_subblock_idx[x0][y0] specifies the merging candidate index of the subblock-based merging candidate list.

ciip_flag[x0][y0] specifies whether the combined inter-picture merge and intra-picture prediction is applied for the current coding unit.

TABLE 2

| | Descriptor |
|---|---|
| merge_data( x0, y0, cbWidth, cbHeight ) { | |
|   if ( CuPredMode[ x0 ][ y0 ] == MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag \|\| cbWidth * cbHeight != 32 ) | |
|       regular_merge_flag[ x0 ][ y0 ] | ae(v) |
|     if ( regular_merge_flag[ x0 ][ y0 ] == 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] == 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] == 0 && | |
|             ( cbWidth * cbHeight ) >= 64 && cbWidth < 128 && cbHeight < 128 ) | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | | merge_triangle_idx0[x0][y0] specifies the first merging candidate index of the triangular shape based motion compensation candidate list.

merge_triangle_idx1[x0][y0] specifies the second merging candidate index of the triangular shape based motion compensation candidate list.

merge_idx[x0][y0] specifies the merging candidate index of the merging candidate list.

Meanwhile, referring again to the CU syntax of Table 1, mvp_l0_flag[x0][y0] specifies the motion vector predictor index of list 0. That is, in case that the MVP mode is applied, the mvp_l0_flag may represent a candidate being selected for MVP derivation of the current block in MVP candidate list.

ref_idx_l1[x0][y0] has the same semantics as ref_idx_l0, with l0, L0 and list 0 replaced by l1, L1 and list 1, respectively.

inter_pred_idc[x0][y0] specifies whether list0, list1, or bi-prediction is used for the current coding unit.

sym_mvd_flag[x0][y0] equal to 1 specifies that the syntax elements ref_idx_l0[x0][y0] and ref_idx_l1[x0][y0], and the mvd_coding(x0, y0, refList,cpIdx) syntax structure for refList equal to 1 are not present. That is, the sym_mvd_flag represents whether the symmetric MVD is used in mvd coding.

ref_idx_l0[x0][y0] specifies the list 0 reference picture index for the current coding unit.

ref_idx_l1[x0][y0] has the same semantics as ref_idx_l0, with l0, L0 and list 0 replaced by l1, L1 and list 1, respectively.

inter_affine_flag[x0][y0] equal to 1 specifies that for the current coding unit, when decoding a P or B slice, affine model based motion compensation is used to generate the prediction samples of the current coding unit.

cu_affine_type_flag[x0][y0] equal to 1 specifies that for the current coding unit, when decoding a P or B slice, 6-parameter affine model based motion compensation is used to generate the prediction samples of the current coding unit. cu_affine_type_flag[x0][y0] equal to 0 specifies that 4-parameter affine model based motion compensation is used to generate the prediction samples of the current coding unit.

amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_flag[x0][y0].

amvr_precision_flag[x0][y0] equal to 0 specifies that the resolution of the motion vector difference is one integer luma sample if inter_affine_flag[x0][y0] is equal to 0, and 1/16 of a luma sample otherwise. amvr_precision_flag [x0][y0] equal to 1 specifies that the resolution of the motion vector difference is four luma samples if inter_affine_flag [x0][y0] is equal to 0, and one integer luma sample otherwise. The array indices x0, y0 specify the location (x0, y0) of the top-left luma sample of the considered coding block relative to the top-left luma sample of the picture.

bcw_idx[x0][y0] specifies the weight index of bi-prediction with CU weights.

The coding apparatus may perform inter prediction using motion information of the current block. The encoding apparatus may derive optimum motion information for the current block through a motion estimation procedure. For example, the encoding apparatus may search a similar reference block having high correlation in the unit of a fractional pixel within a determined search range in a reference picture using the original block in the original picture for the current block, and through this, the encoding apparatus may derive motion information. The block similarity may be derived based on a difference between phase-based sample values. For example, the block similarity may be calculated based on the SAD between the current block (or template of the current block) and the reference block (or template of the reference block). In this case, motion information may be derived based on the reference block having the smallest SAD in the search area. The derived motion information may be signaled to the decoding apparatus according to several methods based on the inter prediction mode.

The coding apparatus may derive prediction sample(s) for the current block based on the motion information. The current block including the prediction samples may be called a predicted block.

The predicted block may include prediction samples (prediction sample array) of the current block. In case that the motion vector of the current block indicates the fractional sample unit, an interpolation procedure may be performed, and through this, the prediction samples of the current block may be derived based on the reference samples in the fractional sample unit in the reference picture. In case that affine inter prediction is applied to the current block, the coding apparatus may generate the prediction samples based on the motion vector (MV) in the unit of sample/subblock. In case that the bi-prediction is applied, the prediction samples derived through a weighted sum or weighted average (according to phases) of the prediction samples derived based on L0 prediction (i.e., prediction using the reference picture in the reference picture list L0 and MVL0) and the prediction samples derived based on L1 prediction (i.e., prediction using the reference picture in the reference picture list L1 and MVL1) may be used as the prediction samples of the current block. If the reference picture used for L0 prediction and the reference picture used for L1 prediction are located in different temporal directions based on the current picture when the bi-prediction is applied (i.e., in case of corresponding to the bi-prediction and bi-directional prediction), they may be called true bi-prediction.

Reconstructed samples and a reconstructed picture may be generated based on the derived prediction samples, and thereafter, procedures of in-loop filtering and the like may be performed.

Figure 6:
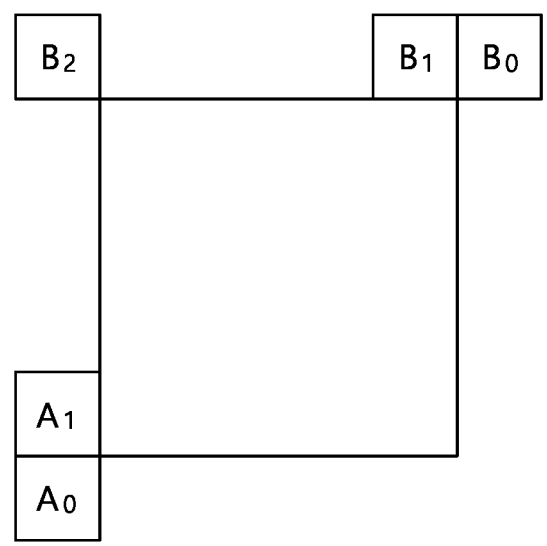
FIG. 6 is a diagram illustrating a spatial candidate which may be used for inter prediction.

FIG. 6 is a diagram explaining spatial candidates that can be used for inter prediction.

In case that a merge mode is applied during inter prediction, motion information of the current block is not directly transmitted, and the motion information of the current block is induced using motion information of a neighbouring prediction block. Accordingly, the encoding apparatus may represent the motion information of the current block by transmitting flag information representing that the merge mode is used and a merge index representing which neighbouring prediction block is used. The merge mode may be called a regular merge mode.

The coding apparatus searches merge candidate blocks being used to induce the motion information of the current block in order to perform the merge mode. For example, maximally 5 merge candidate blocks may be used, but in the present embodiment, the number of merge candidate blocks is not limited thereto. Further, information about the maximum number of merge candidate blocks may be transmitted in a slice header or tile group header, but the present embodiment is not limited thereto. After finding the merge candidate blocks, the coding apparatus may generate a merge candidate list, and may select the merge candidate block having the smallest cost among them as the final merge candidate block.

This document provides various embodiments for the merge candidate blocks constituting the merge candidate list.

The merge candidate list may include, for example, 5 merge candidate blocks. For example, 4 spatial merge candidates and one temporal merge candidate may be used. As a specific example, in case of the spatial merge candidates, blocks $A_0$, A1, $B_0$, $B_1$, and $B_2$ illustrated in FIG. 6 may be used as the spatial merge candidates. Hereinafter, the spatial merge candidate or spatial MVP candidate to be described later may be called SMVP, and the temporal merge candidate or temporal MVP candidate to be described later may be called TMVP.

The merge candidate list for the current block may be configured based on, for example, the following procedure.

First, the coding apparatus (encoding apparatus/decoding apparatus) may insert the spatial merge candidates derived by searching the spatial neighbouring blocks of the current block into the merge candidate list. For example, the spatial neighbouring blocks may include a bottom-left corner neighbouring block $A_0$, left neighbouring block $A_1$, top-left corner neighbouring block $B_0$, top neighbouring block $B_1$, and top-left corner neighbouring block $B_2$ of the current block. However, this is exemplary, and additional neighbouring blocks, such as right neighbouring block, bottom neighbouring block, bottom-right neighbouring block, may be further used as the spatial neighbouring blocks in addition to the above-described spatial neighbouring blocks. The coding apparatus may detect enabled blocks by searching the spatial neighbouring blocks based on priority, and may derive the motion information of the detected blocks as the spatial merge candidates. For example, the encoding apparatus and/or the decoding apparatus may search 5 blocks illustrated in FIG. 6 in the order of $A_1$, $B_1$, $B_0$, $A_0$, and $B_2$, and may configure the merge candidate list by sequentially indexing the enabled candidates.

Further, the coding apparatus may insert the temporal merge candidates derived by searching the temporal neighbouring blocks of the current block into the merge candidate list. The temporal neighbouring block may be located on a reference picture that is a picture different from the current picture in which the current block is located. The reference picture, in which the temporal neighbouring block is located, may be called a collocated picture or col picture. The temporal neighboring block may be searched in the order of a bottom-right corner neighbouring block and a bottom-right center block of the co-located block for the current block on the col picture.

Meanwhile, the coding apparatus may identify whether the number of current merge candidates is smaller than the number of maximum merge candidates. The number of maximum merge candidates may be predefined, or may be signaled from the encoding apparatus to the decoding apparatus. For example, the encoding apparatus may generate information about the number of maximum merge candidates, encode the information, and transfer the encoded information to the decoding apparatus in the form of a bitstream. If the number of maximum merge candidates is filled up, a subsequent candidate addition process may not be performed.

If the number of current merge candidates is smaller than the number of maximum merge candidates as the result of the identification, the coding apparatus may insert the additional merge candidates into the merge candidate list. The additional merge candidates may include at least one of, for example, history based merge candidate(s), pair-wise average merge candidate(s), ATMVP, combined bi-predictive merge candidate(s) (in case that the slice/tile group type of the current slice/tile group is a B type), and/or zero-vector merge candidate(s).

If the number of current merge candidates is not smaller than the number of maximum merge candidates as the result of the identification, the coding apparatus may end the configuration of the merge candidate list. In this case, the encoding apparatus may select the optimum merge candidate among the merge candidates constituting the merge candidate list based on the rate-distortion (RD) cost, and may signal selection information (e.g., merge index) indicating the selected merge candidate to the decoding apparatus. The decoding apparatus may select the optimum merge candidate based on the merge candidate list and the selection information.

The motion information of the selected merge candidate may be used as the motion information of the current block, and as described above, the prediction samples of the current block may be derived based on the motion information of the current block. The encoding apparatus may derive residual samples of the current block based on the prediction samples, and may signal residual information about the residual samples to the decoding apparatus. As described above, the decoding apparatus may generate reconstructed samples based on the residual samples derived based on the residual information and the prediction samples, and based on this, the decoding apparatus may generate the reconstructed picture.

In case that the skip mode is applied during inter prediction, the motion information of the current block can be derived in the same manner as the case that the merge mode is applied. However, in case that the skip mode is applied, the residual signal for the corresponding block may be omitted, and thus the prediction samples may be immediately used as the reconstructed samples. The skip mode may be applied, for example, when a value of CU skip flag (cu_skip_flag) is 1.

Figure 7:
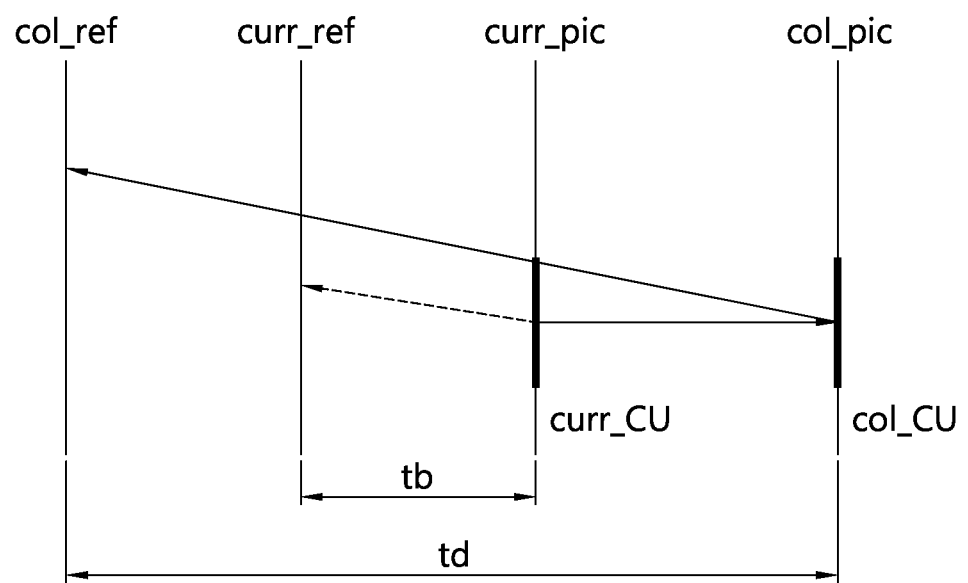
FIG. 7 is a diagram illustrating a temporal candidate which may be used for inter prediction.

FIG. 7 is a diagram explaining a temporal candidate that can be used for inter prediction.

Here, a temporal candidate may represent the above-described temporal merge candidate. Further, motion vector included in the temporal candidate may correspond to a temporal mvp candidate.

In this step, only one candidate is added to the candidate list. Particularly, in the derivation of this temporal merge candidate, a scaled motion vector is derived based on co-located CU belonging to the collocated reference picture (may be referred to as colPic). The reference picture list to be used for derivation of the co-located CU is explicitly signaled in the slice header. The scaled motion vector for temporal merge candidate is obtained as illustrated by the dotted line in FIG. 7, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

In addition to merge mode, where the implicitly derived motion information is directly used for prediction samples generation of the current CU, the merge mode with motion vector differences (MMVD) is introduced in VVC. Because similar motion information derivation methods are used for the skip mode and the merge mode, MMVD may be applied to the skip mode. A MMVD flag (ex. mmvd_flag) may be signaled right after sending a skip flag and merge flag to specify whether MMVD mode is used for a CU.)

In MMVD, after a merge candidate is selected, it is further refined by the signaled MVDs information. When MMVD is applied to the current block (i.e. when the mmvd_flag is equal to 1), further information for the MMVD may be signaled.

The further information includes a merge candidate flag (ex. mmvd_merge_flag) indicating whether the first (0) or the second (1) candidate in the merging candidate list is used with the motion vector difference, an index to specify motion magnitude (ex. mmvd_distance_idx), and an index for indication of motion direction (ex. mmvd_direction_idx). In MMVD mode, one for the first two candidates in the merge list is selected to be used as MV basis. The merge candidate flag is signaled to specify which one is used.

Distance index specifies motion magnitude information and indicate the pre-defined offset from the starting point.

An offset is added to either horizontal component or vertical component of starting MV. The relation of distance index and pre-defined offset is specified in Table 3.

Direction index represents the direction of the MVD relative to the starting point. The direction index can represent of the four directions as shown in Table 4. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 4 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 4 specifies the sign of MV offset added to the list0 MV component of starting MV and the sign for the list1 MV has opposite value.

TABLE 4

| mmvd_direction_idx[ x0 ][ y0 ] | MmvdSign[ x0 ][ y0 ][ 0 ] | MmvdSign[ x0 ][ y0 ][ 1 ] |
| --- | --- | --- |
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows.

$$MmvdOffset[x0][y0][0] = (MmvdDistance[x0][y0] \ll 2) * MmvdSign[x0][y0][0]$$

$$MmvdOffset[x0][y0][1] = (MmvdDistance[x0][y0] \ll 2) * MmvdSign[x0][y0][1]$$

[Equation 1]

Figure 8:
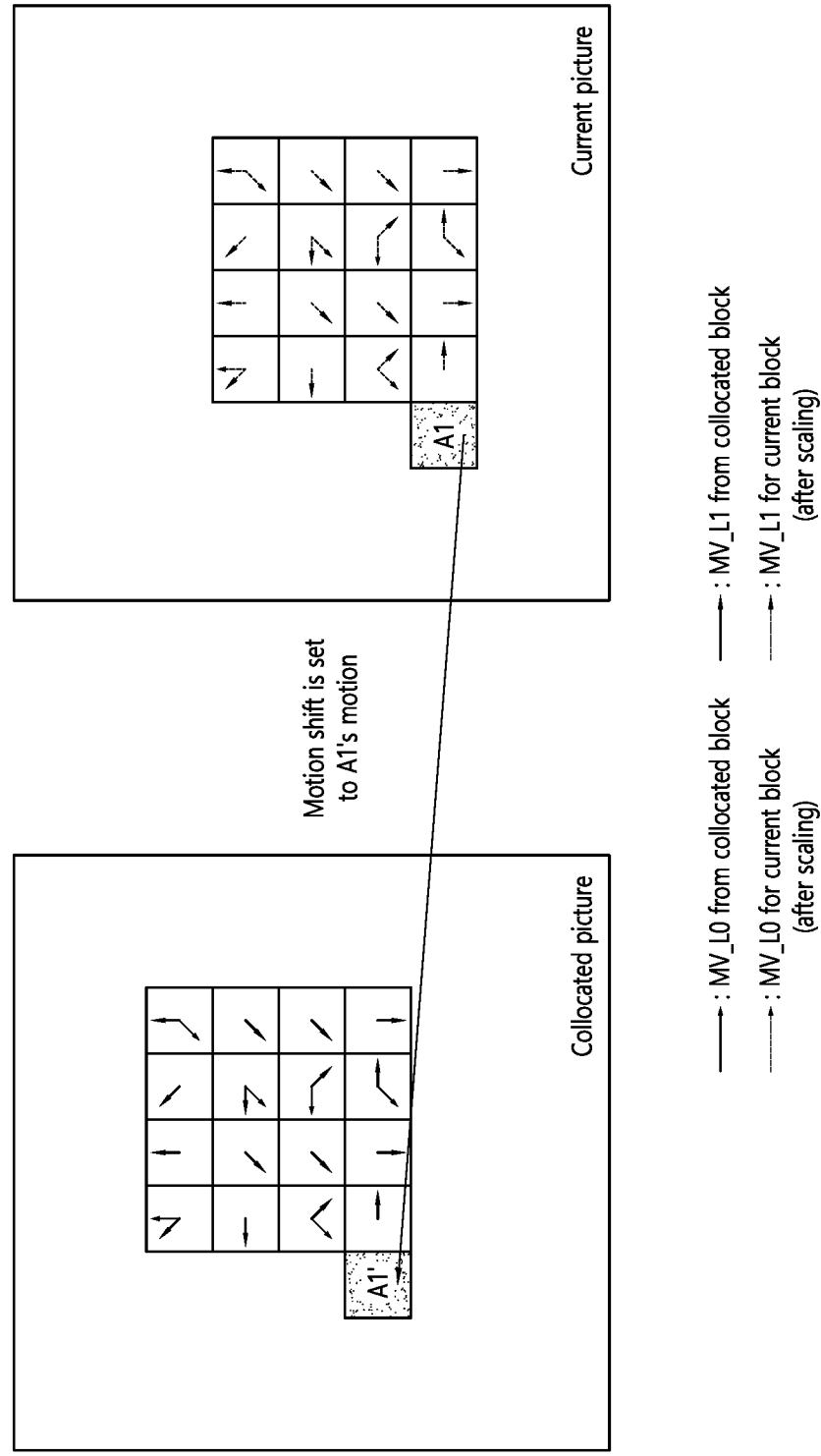
FIG. 8 is a diagram illustrating a subblock-based temporal motion vector prediction process which may be used in inter prediction.

FIG. 8 is a diagram explaining a subblock-based temporal motion vector prediction process that can be used during inter prediction.

TABLE 3

| | MmvdDistance[ x0 ][ y0 ] | |
| --- | --- | --- |
| mmvd_distance_idx[ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Here, slice_fpel_mmvd_enabled_flag equal to 1 specifies that merge mode with motion vector difference uses integer sample precision in the current slice. slice_fpel_mmvd_enabled_flag equal to 0 specifies that merge mode with motion vector difference can use fractional sample precision in the current slice. When not present, the value of slice_fpel_mmvd_enabled_flag is inferred to be 0. slice_fpel_mmvd_enabled_flag syntax element may be signaled through (may be comprised in) a slice header.

Subblock-based temporal motion vector prediction (SbTMVP) method can be used for inter prediction. Similar to the temporal motion vector prediction (TMVP), SbTMVP uses the motion field in the collocated picture to improve motion vector prediction and merge mode for CUs in the current picture. The same collocated picture used by TMVP is used for SbTVMP. SbTMVP differs from TMVP in the following two main aspects.

1. TMVP predicts motion at CU level but SbTMVP predicts motion at sub-CU level.

2. Whereas TMVP fetches the temporal motion vectors from the collocated block in the collocated picture (the collocated block is the bottom-right or center (below-right center) block relative to the current CU), SbTMVP applies a motion shift before fetching the temporal motion information from the collocated picture, where the motion shift is obtained from the motion vector from one of the spatial neighbouring blocks of the current CU.

FIG. 8 illustrates the SbTVMP process. SbTMVP predicts the motion vectors of the sub-CUs within the current CU in two steps. In the first step, the spatial neighbour A1 is examined. If A1 has a motion vector that uses the collocated picture as its reference picture is identified, this motion vector (may be referred to as a temporal MV (tempVM)) is selected to be the motion shift to be applied.) If no such motion is identified, then the motion shift is set to (0, 0).

In the second step, the motion shift identified in Step 1 is applied (i.e. added to the current block's coordinates) to obtain sub-CU-level motion information (motion vectors and reference indices) from the collocated picture as shown in FIG. 8. The example in FIG. 8 assumes the motion shift is set to block A1's motion. Then, for each sub-CU, the motion information of its corresponding block (the smallest motion grid that covers the center sample) in the collocated picture is used to derive the motion information for the sub-CU. The center sample (below right center sample) may correspond to a below-right sample among 4 central samples in the sub-CU when the sub-block has even length width and height.)

After the motion information of the collocated sub-CU is identified, it is converted to the motion vectors and reference indices of the current sub-CU in a similar way as the TMVP process, where temporal motion scaling may be applied to align the reference pictures of the temporal motion vectors to those of the current CU.

A combined sub-block based merge list which contains both SbTVMP candidate and affine merge candidates may be used for the signaling of affine merge mode (may be referred to as sub-block (based) merge mode). The SbTVMP mode is enabled/disabled by a sequence parameter set (SPS) flag. If the SbTMVP mode is enabled, the SbTMVP predictor is added as the first entry of the list of sub-block merge candidates, and followed by the affine merge candidates. The maximum allowed size of the affine merge candidate list may be 5.

The sub-CU size used in SbTMVP may be fixed to be 8×8, and as done for affine merge mode, SbTMVP mode may be only applicable to the CU with both width and height are larger than or equal to 8.

The encoding logic of the additional SbTMVP merge candidate is the same as for the other merge candidates, that is, for each CU in P or B slice, an additional RD check may be performed to decide whether to use the SbTMVP candidate.

Figure 9:
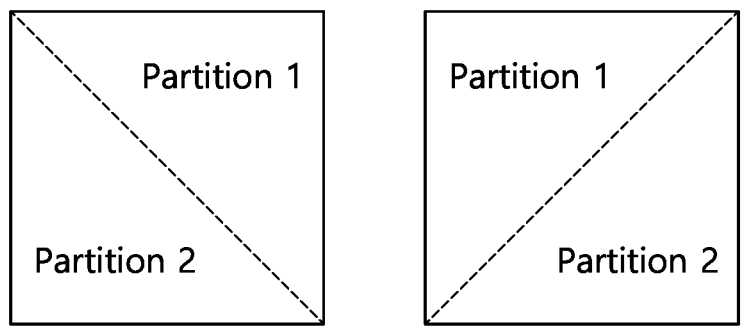
FIG. 9 is a diagram illustrating a partitioning mode which may be applied to inter prediction.

FIG. 9 is a diagram explaining a partitioning mode that can be applied to inter prediction.

A triangle partition mode may be used for inter prediction. The triangle partition mode may be only applied to CUs that are 8×8 or larger. The triangle partition mode is signaled using a CU-level flag as one kind of merge mode, with other merge modes including the regular merge mode, the MMVD mode, the CIIP mode and the subblock merge mode.

When this mode is used, a CU may be split evenly into two triangle-shaped partitions, using either the diagonal split or the anti-diagonal split as shown in FIG. 9. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated predictions are needed for each CU.

If triangle partition mode is used for the current CU, then a flag indicating the direction of the triangle partition (diagonal or anti-diagonal), and two merge indices (one for each partition) are further signaled. The number of maximum TPM candidate size is signaled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units. The triangle partition mode is not used in combination with SBT, that is, when the signaled triangle mode is equal to 1, the cu_sbt_flag is inferred to be 0 without signaling.

The uni-prediction candidate list is derived directly from the merge candidate list constructed as described above.

After predicting each triangle partition using its own motion, blending is applied to the two prediction signals to derive samples around the diagonal or anti-diagonal edge.

Combined inter and intra prediction can be applied to a current block. An additional flag (ex. ciip_flag) may be signaled to indicate if the combined inter/intra prediction (CIIP) mode is applied to the current CU. For example, when a CU is coded in merge mode, if the CU contains at least 64 luma samples (that is, CU width times CU height is equal to or larger than 64), and if both CU width and CU height are less than 128 luma samples, the additional flag is signaled to indicate if the combined inter/intra prediction (CIIP) mode is applied to the current CU. As its name indicates, the CIIP prediction combines an inter prediction signal with an intra prediction signal. The inter prediction signal in the CIIP mode P_inter is derived using the same inter prediction process applied to regular merge mode; and the intra prediction signal P_intra is derived following the regular intra prediction process with the planar mode. Then, the intra and inter prediction signals are combined using weighted averaging, where the weight value is calculated depending on the coding modes of the top and left neighbouring blocks as follows.

If the top neighbour is available and intra coded, then set isIntraTop to 1, otherwise set isIntra Top to 0.

If the left neighbour is available and intra coded, then set isIntraLeft to 1, otherwise set isIntraLeft to 0.

If (isIntraLeft+isIntraLeft) is equal to 2, then wt is set to 3.

Otherwise, if (isIntraLeft+isIntraLeft) is equal to 1, then wt is set to 2.

Otherwise, set wt to 1.

The CIIP prediction is formed as follows.

$$P_{CIIP} = ((4 - \text{wt}) * P_{inter} + \text{wt} * P_{intra} + 2) \gg 2 \qquad \text{[Equation 2]}$$

Meanwhile, in order to generate a predicted block, the coding apparatus may induce motion information based on the above-described regular merge mode, skip mode, SbTMVP mode, MMVD mode, triangle partition mode (partitioning mode), and/or CIIP mode. Each mode may be enabled/disabled through an on/off flag for each mode included in a sequence parameter set (SPS). If the on/off flag for a specific mode is disabled, the encoding apparatus does not signal a syntax being explicitly transmitted for the corresponding prediction mode in the unit of a CU or PU.

In this document, in order to remove signaling of redundant syntax, a method for signaling a syntax in consideration of an on/off and application method of a merge/skip mode is disclosed.

For example, in case of regular_merge_flag, possible candidates are not present except for a regular merge mode on condition that MMVD, subblock merge, CIIP merge, and triangle merge are not allowed, and thus the flag (e.g., regular merge flag) is not necessary to be signaled.

Further, mmvd-related flag (e.g., mmvd_merge_flag) is not necessary to be signaled on condition that the subblock merge, CIIP merge, and triangle merge are not allowed.

The subblock-related flag (e.g., merge_subblock_flag) is not necessary to be signaled on condition that the CIIP merge and the triangle merge are not allowed.

The CIIP-related flag (e.g., ciip_flag) is not necessary to be signaled on condition that the triangle merge is not allowed.

According to the merge data syntax of Table 2, in case that specific modes for the merge/skip mode are disabled in all or partially, redundant signaling of the on/off flag occurs. Accordingly, in this document, the following method may be used to prevent redundant signaling of the same information (flag) in a process of selecting a merge mode that is applied to the current block.

The following drawings have been prepared to explain a specific example of this document. Since names of specific devices and signals/information described in the drawings are exemplarily presented, the technical features of the present specification are not limited to the specific names used in the following drawings.

Figure 10:
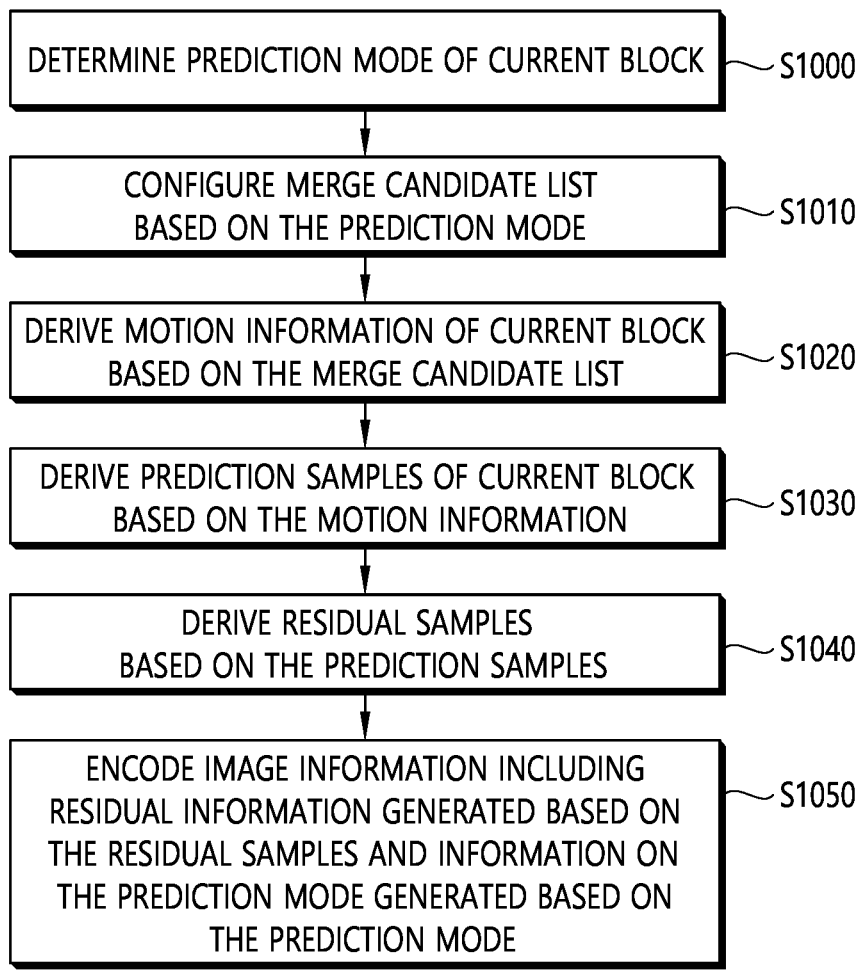
FIGS. 10 and 11 schematically represent an example of a video/image encoding method including an inter prediction method, and associated components according to an embodiment of this document.
Figure 11:
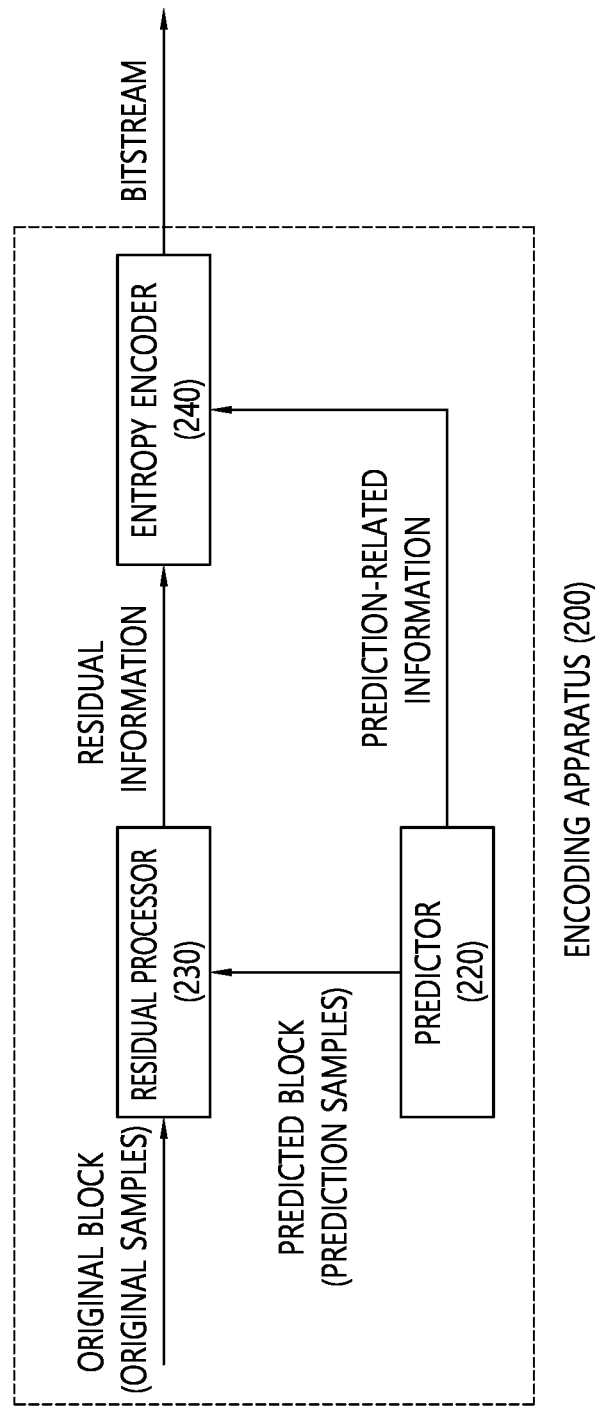

FIGS. 10 and 11 schematically illustrate an example of a video/image encoding method including an inter prediction method and related components according to an embodiment of the present disclosure.

An encoding method disclosed in FIG. 10 may be performed by an encoding apparatus 200 disclosed in FIG. 2. Specifically, for example, S1000 to S1030 of FIG. 10 may be performed by the predictor 220 of the encoding apparatus 200, and S1040 may be performed by the residual processor 230 of the encoding apparatus 200, and S1050 may be performed by the entropy encoder 240 of the encoding apparatus 200. The encoding method disclosed in FIG. 10 may include the above-described embodiments of the present document.

Specifically, referring to FIGS. 10 and 11, the predictor of the encoding apparatus may determine a prediction mode of the current block (S1000). As an example, in case that inter prediction is applied to the current block, the predictor of the encoding apparatus may determine any one of a regular merge mode, skip mode, MMVD mode, subblock merge mode, partitioning mode, and CIIP mode as the prediction mode of the current block.

Here, the regular merge mode may be defined as a mode for inducing motion information of the current block using motion information of a neighboring block. The skip mode may be defined as a mode in which a predicted block is used as a reconstructed block. The MMVD mode may be applied to the merge mode or the skip mode, and may be defined as a merge (or skip) mode using a motion vector difference. The subblock merge mode may be defined as a merge mode based on the subblock. The partitioning mode may be defined as a mode in which prediction is performed through division of the current block into two partitions (diagonal or anti-diagonal). The CIIP mode may be defined as a mode in which inter-picture merge and intra-picture prediction are combined with each other.

The predictor of the encoding apparatus may configure a merge candidate list based on the prediction mode of the current block (S1010). For example, in case that the prediction mode for the current block is determined as the (regular) merge mode, the predictor of the encoding apparatus may configure the merge candidate list (or motion information candidate list) based on the spatial neighboring blocks and the temporal neighboring blocks of the current block, and based on this, the predictor of the encoding apparatus may generate the motion information.

The predictor of the encoding apparatus may derive motion information of the current block based on the merge candidate list (S1020). The motion information may include a motion vector and a reference picture index. For example, in case that the prediction mode for the current block is determined as a (regular) merge mode, the predictor of the encoding apparatus may configure a merge candidate list (or motion information candidate list) based on the spatial neighboring blocks and temporal neighboring blocks of the current block, and based on this, the predictor of the encoding apparatus may generate the motion information. In this case, the predictor of the encoding apparatus may derive a reference block having a difference from the current block, which is minimum or is equal to or smaller than a predetermined reference by searching a block similar to the current block in a certain area (search area) of reference pictures through motion estimation, and based on this, the predictor of the encoding apparatus may derive a reference picture index indicating a reference picture in which the reference block is located. Further, the predictor of the encoding apparatus may derive a motion vector based on the difference in location between the reference block and the current block.

The predictor of the encoding apparatus may derive the prediction samples (predicted block) of the current block based on the prediction mode of the current block and the motion information of the current block (S1030). Further, the predictor of the encoding apparatus may generate information about the prediction mode based on the prediction mode. Here, the information about the prediction mode may include inter/intra prediction classification information and inter prediction mode information, and may include various syntax elements related to the information.

The residual processor of the encoding apparatus may derive residual samples based on the original samples (original block) for the current block and the prediction samples (predicted block) for the current block (S1040). Further, the residual processor of the encoding apparatus may derive information about the residual samples based on the residual samples.

The encoder of the encoding apparatus may encode image information including information about the residual samples and information about the prediction mode (S1050). The image information may include partitioning-related information, prediction mode-related information, residual information, and in-loop filtering-related information, and may include various syntax elements related to the information. The information encoded by the encoder of the encoding apparatus may be output in the form of a bitstream. The bitstream may be transmitted to the decoding apparatus through a network or a storage medium.

For example, the image information may include information about various parameter sets, such as adaptation For this, as an example, the merge data syntax may be configured as in Table 5 below.

TABLE 5

|  | Descriptor |
|---|---|
| merge_data( x0, y0, cbWidth, cbHeight ) { | |
|   if ( CuPredMode[ x0 ][ y0 ]  = =  MODE_IBC ) { | |
|     if( MaxNumMergeCand > 1 ) | |
|       merge_idx[ x0 ][ y0 ] | ae(v) |
|   } else { | |
|     if(MMVDAllowed \|\| MergeSubBlockAllowed \|\| MergeCIIPAllowed \|\| MergeTriangleAllowed) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( MMVDAllowed &&(MergeSubBlockAllowed \|\| MergeCIIPAllowed \|\| MergeTriangleAllowed)) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if(MergeSubBlockAllowed && ( MergeCIIPAllowed \|\| MergeTriangleAllowed )  ) | |
|           merge_subblock_flag[ x0 ][ y0 ] | ae(v) |
|         if( merge_subblock_flag[ x0 ][ y0 ]  = =  1 ) { | |
|           if( MaxNumSubblockMergeCand > 1 ) | |
|             merge_subblock_idx[ x0 ][ y0 ] | ae(v) |
|         } else { | |
|           if(MergeCIIPAllowed && MergeTriangleAllowed) { | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | | parameter set (APS), picture parameter set (PPS), sequence parameter set (SPS), or video parameter set (VPS). Further, the image information may include information about the prediction mode for the current block, such as coding unit syntax and merge data syntax. Here, the sequence parameter set may include a combined inter-picture merge and intra-picture prediction (CIIP) enabled flag (ciip enabled flag) and an enabled flag for a partitioning mode. The coding unit syntax may include a CU skip flag representing whether the skip mode is applied to the current block.

According to an embodiment, as an example, in order to prevent duplicate transmission of the same syntax, the encoding apparatus may apply parts or all of regular_merge_flag signaling condition and related semantics, MMVD_merge_flag signaling condition and related semantics, merge_subblock_flag signaling condition and related semantics, and/or CIIP flag signaling condition and related semantics based on a condition on which MMVD (MMVD mode) is allowed (MMVDAllowed), a condition on which merge subblock (subblock merge mode) is allowed (MergeSubBlockAllowed), a condition on which merge CIIP (CIIP mode) is allowed (MergeCIIPAllowed), and/or a condition on which merge triangle (partitioning mode) is allowed (MergeTriangleAllowed).

In Table 5, general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows.

If cu_skip_flag[x0][y0] is equal to 1, general_merge_flag [x0][y0] is inferred to be equal to 1.

Otherwise, general_merge_flag[x0][y0] is inferred to be equal to 0.

In Table 5, the condition on which the MMVD (MMVD mode) is allowed (MMVDAllowed), the condition on which the merge subblock (subblock merge mode) is allowed (MergeSubBlockAllowed), the condition on which the merge CIIP (CIIP mode) is allowed (MergeCIIPAllowed), and/or the condition on which the merge triangle (partitioning mode) is allowed (MergeTriangleAllowed) may be induced according to the following conditions.

If all of the following conditions are true, the variable MMVDAllowed is set equal to true.

general_merge_flag[x0][y0] is equal to 1 sps_mmvd_enabled_flag is equal to 1 cbWidth*cbHeight is greater than 32
If all of the following conditions are true, the variable MergeSubblockAllowed is set equal to true.
 general_merge_flag[x0][y0] is equal to 1
 MaxNumSubblockMergeCand >0
 cbWidth is greater than or equal to 8 and cbHeight is greater than or equal to 8
If all of the following conditions are true, the variable MergeCIIPAllowed is set equal to true.
 general_merge_flag[x0][y0] is equal to 1
 sps_ciip_enabled_Flag is equal to 1
 cu_skip_flag[x0][y0] is equal to 0
 cbWidth*cbHeight is greater than or equal to 64
 cbWidth is smaller than 128 and cbHeight is smaller than 128
If all of the following conditions are true, MergeTriangleAllowed is set equal to true.
 general_merge_flag[x0][y0] is equal to 1
 sps_triangle_enalbed_Flag is equal to 1 and slice_type is equal to B
 NaxNumTriangleMergeCand is greater than or equal to 2
 cbWidth*cbHeight is greater than or equal to 64

Among the above conditions, MMVDAllowed means a condition on which the MMVD is allowable, and in this case, the condition based on the block size is met in case that the current block is not 4×8 block or 8×4 block. However, in case that the uni-prediction MMVD is allowed in the 4×8 block and/or the 8×4 block, compression efficiency can be improved, and thus the MMVDAllowed condition may be changed as follows.

If all of the following conditions are true, the variable MMVDAllowed is set equal to true.
 general_merge_flag[x0][y0] is equal to 1
 sps_mmvd_enabled_flag is equal to 1

Meanwhile, regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

Referring to Table 5, the regular merge flag may be included in the image information and may be signalled in the form of a bitstream in case that at least one value of the MMVD mode-based condition (MMVDAllowed), subblock merge mode-based condition (MergeSubBlockAllowed), CIIP mode-based condition (MergeCIIPAllowed) and partitioning mode-based condition (MergeTriangleAllowed) is 1.

As an example, in case that the CHIP is enabled, the regular merge flag may be included in the bitstream. The case that the CIIP is enabled may be determined based on at least one of a general merge flag, CIIP enabled flag, current block size, and CU skip flag. For example, the regular merge flag may be included in the bitstream in case that the general merge flag value is 1, the CIIP enabled flag value is 1, a product of a height of the current block and a width of the current block is equal to or larger than 64, the height of the current block or the width of the current block is smaller than 128, or the skip flag value is 0. Further, the regular merge flag may be included in the bitstream in case that all conditions based on the general merge flag, CIIP enabled flag, current block size, and CU skip flag are satisfied.

As another example, the regular merge flag may be included in the bitstream in case that the partitioning mode is enabled. The case that the partitioning mode is enabled may be determined based on at least one of the general merge flag, partitioning mode enabled flag representing whether the partitioning mode is enabled, and information on the current block. For example, the regular merge flag may be included in the bitstream in case that the general merge flag value is 1, the partitioning mode enabled flag value is 1, the product of the height of the current block and the width of the current block is equal to or larger than 64, the slice type of the current block is a B slice, or the maximum number of partitioning mode candidates is equal to or larger than 2. Further, the regular merge flag may be included in the bitstream in case that all of the above conditions are satisfied.

When regular_merge_flag[x0][y0] is not present in the merge data syntax, it is inferred as follows.)
If all of the following conditions are true, regular_merge_flag[x0][y0] is inferred to be equal to 1.
 MMVDAllowed is equal to 0
 MergeSubBlockAllowed is equal to 0
 MergeCIIPAllowed is equal to 0
 MergeTriangleAllowed is equal to 0
Otherwise, regular_merge_flag[x0][y0] is inferred to be equal to 0.

Meanwhile, mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

Referring to Table 5, the MMVD merge flag may be included in the image information and may be signaled in the form of a bitstream in case that at least one value of the MMVD mode-based condition (MMVDAllowed), subblock merge mode-based condition (MergeSubBlockAllowed), CIIP mode-based condition (MergeCIIPAllowed), and partitioning mode-based condition (MergeTriangleAllowed) is 1.

When mmvd_merge_flag[x0][y0] is not present in the merge data syntax, it is inferred as follows.
If all of the following conditions are true, mmvd_merge_flag[x0][y0] is inferred to be equal to 1.
 regular_merge_flag[x0][y0] is equeal to 0
 MMVDAllowed is equal to 0
 MergeSubBlockAllowed is equal to 0
 MergeCIIPAllowed is equal to 0
 MergeTriangleAllowed is equal to 0
Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture. When mmvd_cand_flag[x0][y0] is not present, it is inferred to be equal to 0.

mmvd_distance_idx[x0][y0] specifies the index used to derive MmvdDistance[x0][y0] as specified in Table 3. The array indices x0, y0 specify the location (x0, y0) of the top-left luma sample of the considered coding block relative to the top-left luma sample of the picture.

mmvd_direction_idx[x0][y0] specifies index used to derive MmvdSign[x0][y0] as specified in Table 4. The array indices x0, y0 specify the location (x0, y0) of the top-left luma sample of the considered coding block relative to the top-left luma sample of the picture.

Both components of the merge plus MVD offset MmvdOffset[x0][y0] are derived as Equation 1.

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture.

Referring to Table 5, the merge subblock flag may be included in the image information and may be signaled in the form of a bitstream in case that at least one value of the subblock merge mode-based condition (MergeSubBlockAllowed), CIIP mode-based condition (MergeCIIPAllowed), and partitioning mode-based condition (MergeTriangleAllowed) is 1.

When merge_subblock_flag[x0][y0] is not present in the merge data syntax, it is inferred as follow.

If all of the following conditions are true, merge_subblock_flag[x0][y0] is inferred to be equal to 1.
  regular_merge_flag[x0][y0] is equal to 0
  mmvd_merge_flag[x0][y0] is equal to 0
  MergeSubBlockAllowed is equal to 0
  MergeCIIPAllowed is equal to 0
  MergeTriangleAllowed is equal to 0
  Otherwise, merge_subblock_flag[x0][y0] is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

Meanwhile, ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

Referring to Table 5, the CIIP flag may be included in the image information, and may be signaled in the form of a bitstream in case that at least one value of the CIIP mode-based condition (MergeCIIPAllowed) and partitioning mode-based condition (MergeTriangleAllowed) is 1.

For example, the CIIP flag may be included in the bitstream in case that the partitioning mode is enabled. The case that the partitioning mode is enabled may be determined based on at least one of the general merge flag, partitioning mode enabled flag representing whether the partitioning mode is enabled, and information on the current block. For example, the CIIP flag may be included in the bitstream in case that the general merge flag value is 1, the partitioning mode enabled flag value is 1, the product of the height of the current block and the width of the current block is equal to or larger than 64, the slice type of the current block is a B slice, or the maximum number of partitioning mode candidates is equal to or larger than 2. Further, the CIIP flag may be included in the bitstream in case that all the above conditions are satisfied.

When ciip_flag[x0][y0] is not present, it is inferred as follows.

If all the following conditions are true, ciip_flag[x0][y0] is set equal to 1.
  MergeCIIPAllowed is equal to 0
  MergeTriangleAllowed is equal to 0
  Otherwise, ciip_flag[x0][y0] is set equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice, is derived as follows.

If all the following conditions are true, MergeTriangleFlag[x0][y0] is set equal to 1.
  MergeTriangleAllowed is equal to 1
  regular_merge_flag[x0][y0] is equal to 0
  mmvd_merge_flag[x0][y0] is equal to 0
  merge_subblock_flag[x0][y0] is equal to 0
  ciip_flag[x0][y0] is equal to 0
  Otherwise, MergeTriangleFlag[x0][y0] is equal to 0.

Figure 12:
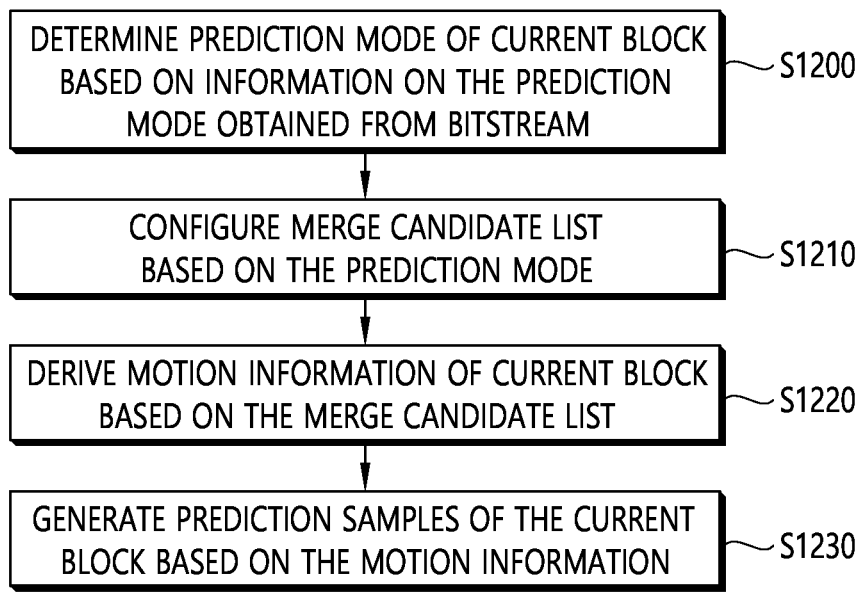
FIGS. 12 and 13 schematically represent an example of a video/image decoding method including an inter prediction method, and associated components according to an embodiment of this document.
Figure 13:
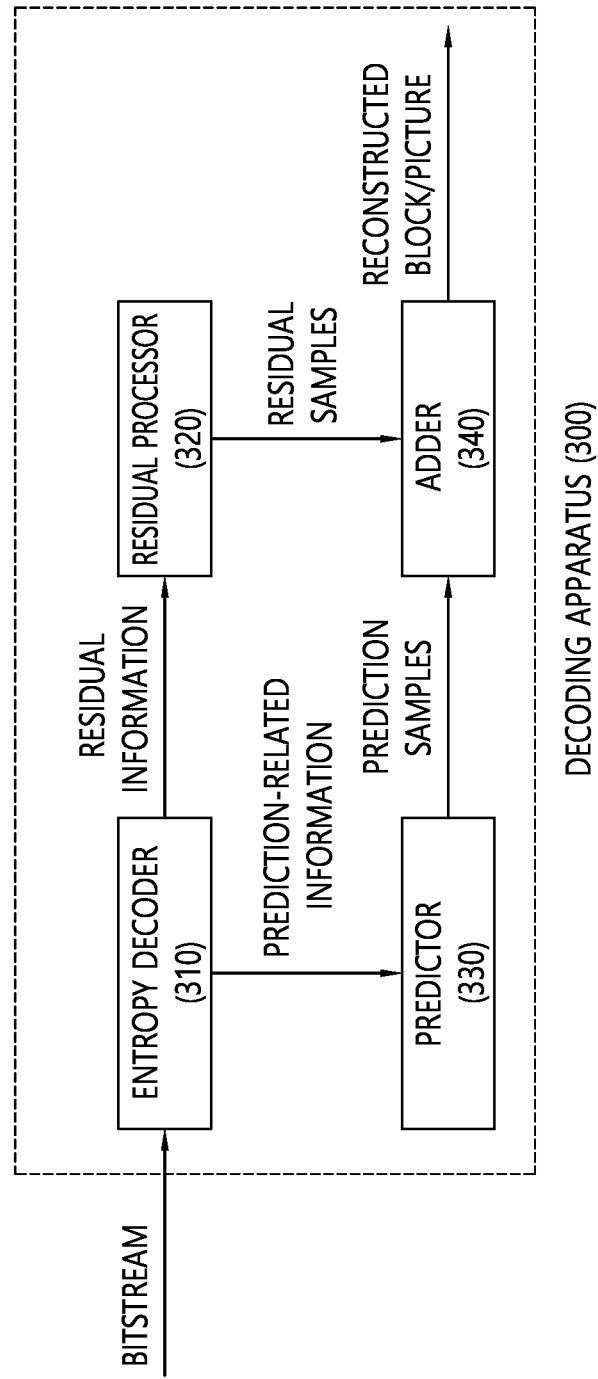

FIGS. 12 and 13 schematically illustrate an example of a video/image decoding method including an inter prediction method and related components according to an embodiment of the present document.

A decoding method disclosed in FIG. 12 may be performed by a decoding apparatus 300 disclosed in FIGS. 3 and 13. Specifically, for example, S1200 to S1230 of FIG. 12 may be performed by the predictor 330 of the decoding apparatus 300. In this document, the decoding method disclosed in FIG. 12 may include the above-described embodiments.

Referring to FIGS. 12 and 13, the decoding apparatus may obtain information on the prediction mode for the current block from the bitstream, and based on this, the decoding apparatus may determine the prediction mode for the current block (S1200). Specifically, the entropy decoder 310 of the decoding apparatus may derive residual information and information on the prediction mode from the signal received from the encoding apparatus of FIG. 2 in the form of a bitstream. Here, the information about the prediction mode may be called prediction-related information. The information about the prediction mode may include inter/intra prediction classification information and inter prediction mode information, and may include various syntax elements related to the information.

In the bitstream, the image information including information about various parameter sets, such as adaptation parameter set (APS), picture parameter set (PPS), sequence parameter set (SPS), or video parameter set (VPS), may be included. The image information may further include information about the prediction mode for the current block, such as coding unit syntax and merge data syntax. The sequence parameter set may include a CIIP enabled flag and an enabled flag for a partitioning mode. The coding unit syntax may include a CU skip flag representing whether the skip mode is applied to the current block.

The predictor 320 of the decoding apparatus may configure a motion information candidate list (or merge candidate list) for the current block based on the prediction mode for the current block (S1210). Further, the predictor 320 of the decoding apparatus may select a merge candidate from the motion information candidate list based on the candidate selection information (merge index) obtained from the bitstream, and may derive the motion information of the current block using the motion information of the selected merge candidate (S1220).

When the motion information of the current block is derived, the predictor of the decoding apparatus may generate prediction samples of the current block based on the motion information of the current block (S1230).

Meanwhile, the residual processor 320 of the decoding apparatus may generate residual samples based on residual information obtained from the bitstream.

The adder 340 of the decoding apparatus may generate reconstructed samples based on the prediction samples generated by the predictor 330 and the residual samples generated by the residual processor 320. The reconstructed picture may be generated based on the reconstructed samples. Thereafter, as needed, in order to improve subjective/objective picture quality, an in-loop filtering procedure, such as deblocking filtering, SAO and/or ALF procedures, may be applied to the reconstructed picture.

As an embodiment, in determining the prediction mode for the current block, the predictor of the decoding apparatus may obtain or parse the regular merge flag from the bitstream in case that at least one value of the MMVD mode-based condition (MMVDAllowed), subblock merge mode-based condition mode-based (MergeSubBlockAllowed), CIIP condition (MergeCIIPAllowed) and partitioning mode-based condition (MergeTriangleAllowed) is 1.

As an example, in case that the CIIP is enabled, the decoding apparatus may parse the regular merge flag from the bitstream. The case that the CIIP is enabled may be determined based on at least one of the general merge flag, CIIP enabled flag, current block size, and CU skip flag. For example, the decoding apparatus may determine that the CIIP is enabled in case that the general merge flag value is 1, the CIIP enabled flag value is 1, the product of the height of the current block and the width of the current block is equal to or larger than 64, the height of the current block or the width of the current block is smaller than 128, or the skip flag value is 0. Further, the decoding apparatus may determine that the CIIP is enabled in case that all conditions based on the general merge flag, CIIP enabled flag, current block size, and CU skip flag are satisfied.

As another example, the decoding apparatus may parse the regular merge flag from the bitstream in case that the partitioning mode is enabled. The case that the partitioning mode is enabled may be determined based on at least one of the general merge flag, partitioning mode enabled flag representing whether the partitioning mode is enabled, and information on the current block. For example, the decoding apparatus may determine that the partitioning mode is enabled in case that the general merge flag value is 1, the partitioning mode enabled flag value is 1, the product of the height of the current block and the width of the current block is equal to or larger than 64, the slice type of the current block is a B slice, or the maximum number of partitioning mode candidates is equal to or larger than 2. Further, the decoding apparatus may determine that the partitioning mode is enabled in case that all of the above conditions are satisfied.

Meanwhile, in determining the prediction mode for the current block, the predictor of the decoding apparatus may obtain or parse the MMVD merge flag from the bitstream in case that at least one value of the MMVD mode-based condition (MMVDAllowed), subblock merge mode-based condition (MergeSubBlockAllowed), CIIP mode-based condition (MergeCIIPAllowed), and partitioning mode-based condition (MergeTriangleAllowed) is 1.

Further, in determining the prediction mode for the current block, the predictor of the decoding apparatus may obtain or parse the merge subblock flag from the bitstream in case that at least one value of the subblock merge mode-based condition (MergeSubBlockAllowed), CIIP mode-based condition (MergeCIIPAllowed), and partitioning mode-based condition (MergeTriangleAllowed) is 1.

Further, in determining the prediction mode for the current block, the predictor of the decoding apparatus may obtain or parse the CIIP flag from the bitstream in case that at least one value of the CIIP mode-based condition (MergeCIIPAllowed) and partitioning mode-based condition (MergeTriangleAllowed) is 1. As an example, the decoding apparatus may parse the CIIP flag from the bitstream in case that the partitioning mode is enabled. The case that the partitioning mode is enabled may be determined based on at least one of the general merge flag, partitioning mode enabled flag representing whether the partitioning mode is enabled, and information on the current block. For example, the decoding apparatus may determine that the partitioning mode is enabled in case that the general merge flag value is 1, the partitioning mode enabled flag value is 1, the product of the height of the current block and the width of the current block is equal to or larger than 64, the slice type of the current block is a B slice, or the maximum number of partitioning mode candidates is equal to or larger than 2. Further, the decoding apparatus may determine that the partitioning mode is enabled in case that all of the above conditions are satisfied.

Although the aforementioned exemplary system has been described on the basis of a flowchart in which steps or blocks are listed in sequence, the steps of the present disclosure are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in the memory and executed by the processor. The memory may be disposed to the processor internally or externally and connected to the processor using a variety of well-known means. The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. That is, the embodiments described herein may be implemented and performed on a processor, microprocessor, controller, or chip. For example, the functional units shown in each drawing may be implemented and performed on a computer, processor, microprocessor, controller, or chip. In this case, information for implementation (ex. information on instructions) or an algorithm may be stored in a digital storage medium.

In addition, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (ex. a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

In addition, the processing method to which the present disclosure is applied may be produced in the form of a program executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (ex. transmission over the Internet). In addition, a bitstream generated by the encoding method may be stored in the computer-readable recording medium or transmitted through a wired or wireless communication network.

In addition, an embodiment of the present disclosure may be embodied as a computer program product based on a program code, and the program code may be executed on a computer by the embodiment of the present disclosure document. The program code may be stored on a carrier readable by a computer.

Figure 14:
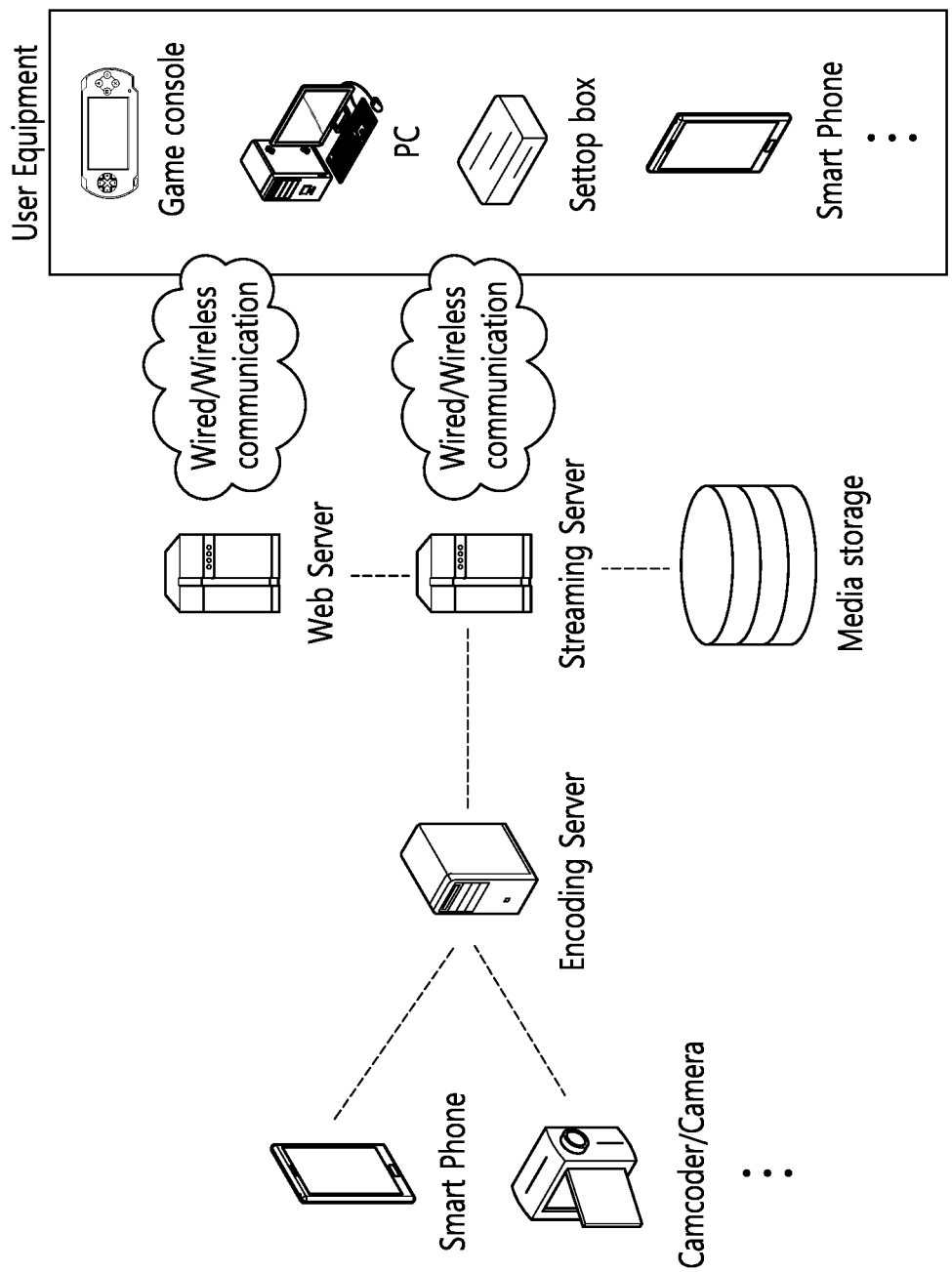
FIG. 14 illustrates an example of a content streaming system to which embodiments disclosed in the present disclosure are applicable.

FIG. 14 illustrates an example of a content streaming system to which embodiments disclosed in this document may be applied.

Referring to FIG. 14, the content streaming system to which the embodiment(s) of this document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. A decoding method performed by a decoding apparatus, the method comprising:
    determining a prediction mode of a current block based on information on the prediction mode obtained from a bitstream;
    configuring a merge candidate list based on the prediction mode;
    deriving motion information of the current block based on the merge candidate list; and
    generating prediction samples of the current block based on the motion information,
    wherein the bitstream includes information on a combined inter-picture merge and intra-picture prediction (CIIP) enabled flag representing whether a CIIP is enabled, and
    wherein the determining includes obtaining a regular merge flag from the bitstream based on the CIIP enabled flag.

2. An encoding method performed by an encoding apparatus, the method comprising:
    determining a prediction mode of a current block;
    configuring a merge candidate list based on the prediction mode;
    deriving motion information of the current block based on the merge candidate list;
    deriving prediction samples of the current block based on the motion information;
    deriving residual samples based on the prediction samples; and
    encoding image information including information on the prediction mode generated based on the prediction mode, and residual information generated based on the residual samples,
    wherein the image information includes information on a combined inter-picture merge and intra-picture prediction (CIIP) enabled flag representing whether a CIIP is enabled, and
    wherein the image information includes a regular merge flag based on the CIIP enabled flag.

3. A non-transitory computer-readable digital storage medium storing a bitstream generated by the method of claim 2.

4. A transmission method of data for image, the transmission method comprising:
    obtaining a bitstream, wherein the bitstream is generated by performing determining a prediction mode of a current block, configuring a merge candidate list based on the prediction mode, deriving motion information of the current block based on the merge candidate list, deriving prediction samples of the current block based on the motion information, deriving residual samples based on the prediction samples and generating the bitstream by encoding image information including information on the prediction mode generated based on the prediction mode, and residual information generated based on the residual samples; and transmitting the data comprising the bitstream, wherein the image information includes information on a combined inter-picture merge and intra-picture prediction (CIIP) enabled flag representing whether a CIIP is enabled, and wherein the image information includes a regular merge flag based on the CIIP enabled flag.

* * * * *